US009514479B2

(12) United States Patent
Lauckhart et al.

(10) Patent No.: US 9,514,479 B2
(45) Date of Patent: *Dec. 6, 2016

(54) SYSTEM AND METHOD FOR ESTIMATING PREVALENCE OF DIGITAL CONTENT ON THE WORLD-WIDE-WEB

(71) Applicant: The Nielsen Company (US), LLC, New York, NY (US)

(72) Inventors: Gregory J. Lauckhart, Seattle, WA (US); Craig B. Horman, Seattle, WA (US); Christa Korol, Seattle, WA (US); James T. Bartot, Seattle, WA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,618

(22) Filed: Jan. 6, 2014

(65) Prior Publication Data

US 2014/0122224 A1    May 1, 2014

Related U.S. Application Data

(63) Continuation of application No. 09/695,216, filed on Oct. 25, 2000, now Pat. No. 8,661,111.

(Continued)

(51) Int. Cl.
G06F 15/173 (2006.01)
G06Q 30/02 (2012.01)
G06F 17/30 (2006.01)

(52) U.S. Cl.
CPC ..... G06Q 30/0246 (2013.01); G06F 17/30864 (2013.01); G06Q 30/02 (2013.01); G06Q 30/0277 (2013.01)

(58) Field of Classification Search
CPC ..... G06F 17/30864; H04L 12/26; H04L 67/22

(Continued)

(56) References Cited

U.S. PATENT DOCUMENTS 3,540,003 A   11/1970   Murphy
3,696,297 A   10/1972   Otero
(Continued)

FOREIGN PATENT DOCUMENTS

JP   09-091308   4/1997
JP   10-124428   5/1998
(Continued)

OTHER PUBLICATIONS

Lynch, Clifford. "Searching the Internet". Scientific America, 1997. pp. 52-56.*

(Continued)

*Primary Examiner* — John MacIlwinen
(74) *Attorney, Agent, or Firm* — Hanley, Flight & Zimmerman, LLC.

(57) ABSTRACT

The present invention is a system, method and computer program product for tracking and measuring digital content that is distributed on a computer network such as the Internet. The system collects online advertisement data, analyzes the data, and uses the data to calculate measurements of the prevalence of those advertisements. The system processes raw traffic data by cleansing and summarizing the traffic data prior to storing the processed data in a database. An advertisement sampling system uses site selection and definition criteria and a probe map to retrieve Web pages from the Internet, extract advertisements from those Web pages, classify each advertisement, and store the data in a database. A statistical summarization system accesses the processed raw traffic data and the advertisement data in the database to calculate advertising prevalence statistics including the advertising frequency, impressions, and spending.

15 Claims, 15 Drawing Sheets

Related U.S. Application Data

(60) Provisional application No. 60/231,195, filed on Sep. 7, 2000, provisional application No. 60/175,665, filed on Jan. 12, 2000.

(58) Field of Classification Search
USPC .................................................. 709/200
See application file for complete search history.

(56) References Cited

U.S. PATENT DOCUMENTS

| | | |
|---|---|---|
| 3,818,458 A | 6/1974 | Deese |
| 3,906,454 A | 9/1975 | Martin |
| 4,044,376 A | 8/1977 | Porter |
| 4,058,829 A | 11/1977 | Thompson |
| 4,125,892 A | 11/1978 | Fuduka et al. |
| 4,166,290 A | 8/1979 | Furtman et al. |
| 4,236,209 A | 11/1980 | Lombardo, Jr. et al. |
| 4,283,709 A | 8/1981 | Lucero et al. |
| 4,355,372 A | 10/1982 | Johnson et al. |
| 4,356,545 A | 10/1982 | West |
| 4,473,824 A | 9/1984 | Claytor |
| 4,516,216 A | 5/1985 | Armstrong |
| 4,546,382 A | 10/1985 | McKenna et al. |
| 4,566,030 A | 1/1986 | Nickerson et al. |
| 4,603,232 A | 7/1986 | Kurland et al. |
| 4,658,290 A | 4/1987 | McKenna et al. |
| 4,677,466 A | 6/1987 | Lert, Jr. et al. |
| 4,677,552 A | 6/1987 | Sibley et al. |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,740,912 A | 4/1988 | Whitaker |
| 4,745,559 A | 5/1988 | Willis et al. |
| 4,751,578 A | 6/1988 | Reiter et al. |
| 4,757,456 A | 7/1988 | Benghiat |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,827,508 A | 5/1989 | Shear |
| 4,831,582 A | 5/1989 | Miller et al. |
| 4,845,658 A | 7/1989 | Gifford |
| 4,849,879 A | 7/1989 | Chinnaswamy et al. |
| 4,868,866 A | 9/1989 | Williams, Jr. |
| 4,887,308 A | 12/1989 | Dutton |
| 4,907,188 A | 3/1990 | Suzuki |
| 4,912,466 A | 3/1990 | Call |
| 4,912,522 A | 3/1990 | Oates et al. |
| 4,912,552 A | 3/1990 | Allison, III et al. |
| 4,924,488 A | 5/1990 | Kosich |
| 4,935,870 A | 6/1990 | Burk, Jr. et al. |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,032,979 A | 7/1991 | Hecht et al. |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,050,213 A | 9/1991 | Shear |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,150,116 A | 9/1992 | West |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | MacNamee et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,253,346 A | 10/1993 | Okabayashi et al. |
| 5,260,878 A | 11/1993 | Luppy |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw et al. |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,339,412 A | 8/1994 | Fueki |
| 5,347,632 A | 9/1994 | Filepp et al. |
| 5,349,662 A | 9/1994 | Johnson et al. |
| 5,351,278 A | 9/1994 | Koshishiba et al. |
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfill |
| 5,371,846 A | 12/1994 | Bates |
| 5,374,951 A | 12/1994 | Welsh |
| 5,375,070 A | 12/1994 | Hershey et al. |
| 5,379,380 A | 1/1995 | Mori et al. |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,398,336 A | 3/1995 | Tantry et al. |
| 5,406,269 A | 4/1995 | Baran |
| 5,408,607 A | 4/1995 | Nishikawa et al. |

(56) References Cited

U.S. PATENT DOCUMENTS

| | | |
|---|---|---|
| 5,410,598 A | 4/1995 | Shear |
| 5,412,778 A | 5/1995 | Andres |
| 5,414,809 A | 5/1995 | Hogan et al. |
| 5,418,728 A | 5/1995 | Yada |
| 5,461,708 A | 10/1995 | Kahn |
| 5,483,658 A | 1/1996 | Grube et al. |
| 5,485,897 A | 1/1996 | Matsumoto et al. |
| 5,491,820 A | 2/1996 | Belove et al. |
| 5,495,581 A | 2/1996 | Tsai |
| 5,499,340 A | 3/1996 | Barritz |
| 5,524,073 A | 6/1996 | Stambler |
| 5,555,303 A | 9/1996 | Stambler |
| 5,557,333 A | 9/1996 | Jungo et al. |
| 5,560,038 A | 9/1996 | Haddock |
| 5,568,471 A | 10/1996 | Hershey et al. |
| 5,572,643 A | 11/1996 | Judson |
| 5,594,911 A | 1/1997 | Cruz et al. |
| 5,604,867 A | 2/1997 | Harwood |
| 5,615,264 A | 3/1997 | Kazmierczak et al. |
| 5,623,652 A | 4/1997 | Vora et al. |
| 5,634,100 A | 5/1997 | Capps |
| 5,638,443 A | 6/1997 | Stefik et al. |
| 5,646,998 A | 7/1997 | Stambler |
| 5,648,965 A | 7/1997 | Thadani et al. |
| 5,671,283 A | 9/1997 | Michener et al. |
| 5,673,382 A | 9/1997 | Cannon et al. |
| 5,675,510 A | 10/1997 | Coffey et al. |
| 5,682,525 A | 10/1997 | Bouve et al. |
| 5,696,702 A | 12/1997 | Skinner et al. |
| 5,706,502 A | 1/1998 | Foley et al. |
| 5,708,709 A | 1/1998 | Rose |
| 5,708,780 A | 1/1998 | Levergood et al. |
| 5,710,915 A | 1/1998 | McElhiney |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilly et al. |
| 5,748,954 A * | 5/1998 | Mauldin |
| 5,787,253 A | 7/1998 | McCreery et al. |
| 5,793,302 A | 8/1998 | Stambler |
| 5,796,952 A | 8/1998 | Davis et al. |
| 5,799,292 A | 8/1998 | Hekmatpour |
| 5,819,156 A | 10/1998 | Belmont |
| 5,819,285 A | 10/1998 | Damico et al. |
| 5,823,879 A | 10/1998 | Goldberg et al. |
| 5,829,001 A | 10/1998 | Li et al. |
| 5,835,923 A | 11/1998 | Shibata et al. |
| 5,838,919 A | 11/1998 | Schwaller et al. |
| 5,848,396 A | 12/1998 | Gerace |
| 5,870,546 A | 2/1999 | Kirsch |
| 5,872,588 A | 2/1999 | Aras et al. |
| 5,878,384 A | 3/1999 | Johnson et al. |
| 5,926,168 A | 7/1999 | Fan |
| 5,931,912 A | 8/1999 | Wu et al. |
| 5,933,811 A | 8/1999 | Angles et al. |
| 5,935,207 A | 8/1999 | Logue et al. |
| 5,936,541 A | 8/1999 | Stambler |
| 5,948,061 A | 9/1999 | Merriman et al. |
| 5,951,643 A | 9/1999 | Shelton et al. |
| 5,956,483 A | 9/1999 | Grate et al. |
| 5,958,010 A | 9/1999 | Agarwal et al. |
| 5,960,409 A * | 9/1999 | Wexler .................. 705/14.41 |
| 5,963,914 A | 10/1999 | Skinner et al. |
| 5,964,839 A | 10/1999 | Johnson et al. |
| 5,974,148 A | 10/1999 | Stambler |
| 5,982,917 A | 11/1999 | Clarke et al. |
| 5,986,653 A | 11/1999 | Phathayakorn et al. |
| 5,991,735 A | 11/1999 | Gerace |
| 5,995,943 A | 11/1999 | Bull et al. |
| 5,999,178 A | 12/1999 | Hwang et al. |
| 5,999,940 A | 12/1999 | Ranger |
| 6,014,638 A | 1/2000 | Burge et al. |
| 6,018,619 A | 1/2000 | Allard et al. |
| 6,029,195 A | 2/2000 | Herz |
| 6,052,730 A | 4/2000 | Felciano et al. |
| 6,070,145 A | 5/2000 | Pinsley et al. |
| 6,078,324 A | 6/2000 | Phathayakorn et al. |
| 6,084,875 A | 7/2000 | Forrest |
| 6,091,956 A | 7/2000 | Hollenberg |
| 6,108,637 A | 8/2000 | Blumenau |
| 6,108,782 A | 8/2000 | Fletcher et al. |
| 6,112,238 A | 8/2000 | Boyd et al. |
| 6,112,240 A | 8/2000 | Pogue et al. |
| 6,115,608 A | 9/2000 | Duran et al. |
| 6,141,686 A | 10/2000 | Jackowski et al. |
| 6,167,358 A | 12/2000 | Othmer et al. |
| 6,173,311 B1 | 1/2001 | Hassett et al. |
| 6,185,586 B1 | 2/2001 | Judson |
| 6,230,204 B1 * | 5/2001 | Fleming, III .................. 709/229 |
| 6,250,930 B1 | 6/2001 | Mintz |
| 6,264,560 B1 | 7/2001 | Goldberg et al. |
| 6,275,854 B1 | 8/2001 | Himmel et al. |
| 6,279,036 B1 | 8/2001 | Himmel et al. |
| 6,279,112 B1 | 8/2001 | O'Toole, Jr. et al. |
| 6,317,787 B1 | 11/2001 | Boyd et al. |
| 6,324,546 B1 | 11/2001 | Ka et al. |
| 6,353,929 B1 | 3/2002 | Houston |
| 6,360,261 B1 | 3/2002 | Boyd et al. |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,434,532 B2 | 8/2002 | Goldband et al. |
| 6,434,614 B1 * | 8/2002 | Blumenau .................. 709/224 |
| 6,449,604 B1 | 9/2002 | Hansen et al. |
| 6,457,025 B2 | 9/2002 | Judson |
| 6,466,970 B1 | 10/2002 | Lee et al. |
| 6,467,089 B1 | 10/2002 | Aust et al. |
| 6,569,095 B2 | 5/2003 | Eggers |
| 6,587,835 B1 | 7/2003 | Treyz et al. |
| 6,601,100 B2 | 7/2003 | Lee et al. |
| 6,606,605 B1 | 8/2003 | Kolls |
| 6,606,657 B1 * | 8/2003 | Zilberstein et al. .......... 709/224 |
| 6,609,239 B1 | 8/2003 | Xavier |
| 6,621,881 B2 | 9/2003 | Srinivasan |
| 6,625,648 B1 | 9/2003 | Schwaller et al. |
| 6,647,269 B2 | 11/2003 | Hendrey et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,712,702 B2 | 3/2004 | Goldberg et al. |
| 6,719,660 B2 | 4/2004 | Palazzolo |
| 6,745,011 B1 | 6/2004 | Hendrickson et al. |
| 6,766,370 B2 | 7/2004 | Glommen et al. |
| 6,807,558 B1 | 10/2004 | Hassett et al. |
| 6,834,308 B1 | 12/2004 | Ikezoye et al. |
| 6,859,833 B2 | 2/2005 | Kirsch et al. |
| 6,968,178 B2 | 11/2005 | Pradhan et al. |
| 7,017,143 B1 | 3/2006 | Andrew et al. |
| 7,069,238 B2 | 6/2006 | I'Anson et al. |
| 7,155,210 B2 | 12/2006 | Benson |
| 7,206,647 B2 | 4/2007 | Kumar |
| 7,702,317 B2 | 4/2010 | Montelius |
| 2002/0040394 A1 | 4/2002 | Shapira |
| 2002/0040395 A1 | 4/2002 | Davis et al. |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0099818 A1 | 7/2002 | Russell et al. |
| 2002/0099819 A1 | 7/2002 | Hattori et al. |
| 2002/0103664 A1 | 8/2002 | Olsson et al. |
| 2002/0112048 A1 | 8/2002 | Gruyer et al. |
| 2002/0133393 A1 | 9/2002 | Tatsumi et al. |
| 2002/0144283 A1 | 10/2002 | Headings et al. |
| 2002/0161673 A1 | 10/2002 | Lee et al. |
| 2003/0046303 A1 | 3/2003 | Chen et al. |
| 2003/0046385 A1 | 3/2003 | Vincent |
| 2003/0054757 A1 | 3/2003 | Kolessar et al. |
| 2003/0055729 A1 * | 3/2003 | Bezos et al. .................. 705/14 |

(56) References Cited

U.S. PATENT DOCUMENTS

| | | |
|---|---|---|
| 2003/0062223 A1 | 4/2003 | Coyle et al. |
| 2003/0115586 A1 | 6/2003 | Lejouan et al. |
| 2003/0144868 A1 | 7/2003 | MacIntyre et al. |
| 2003/0163563 A1 | 8/2003 | Bean |
| 2003/0177488 A1 | 9/2003 | Smith et al. |
| 2003/0187677 A1 | 10/2003 | Malireddy et al. |
| 2003/0208578 A1 | 11/2003 | Taraborelli et al. |
| 2003/0231203 A1 | 12/2003 | Gallella |
| 2004/0205198 A1 | 10/2004 | Zellner et al. |
| 2004/0221033 A1 | 11/2004 | Davis et al. |
| 2004/0260470 A1 | 12/2004 | Rast |
| 2005/0114511 A1 | 5/2005 | Davis et al. |
| 2005/0216509 A1 | 9/2005 | Kolessar et al. |
| 2006/0004627 A1 | 1/2006 | Baluja |
| 2007/0038516 A1 | 2/2007 | Apple et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0086356 A1 | 4/2008 | Glassman et al. |
| 2008/0126420 A1 | 5/2008 | Wright et al. |
| 2008/0140479 A1 | 6/2008 | Mello et al. |

FOREIGN PATENT DOCUMENTS

| | | |
|---|---|---|
| JP | 11-039258 | 2/1999 |
| WO | 9859309 | 12/1998 |

OTHER PUBLICATIONS

Douglis, Fred et al. "Rate of Change and other Metrics: a Live Study of the World Wide Web". USENIX Symposium on Internet Technologies and Systems. Dec. 1997. pp. 1-14.*

Paltridge, Sam. "mining and mapping web content". info: the journal of policy, regulation and strategy for telecommunications information and media. vol. 1. No. 4. Aug. 1999. pp. 327-342.*

Net. Genesis and Devra Hall, "Build a Web Site: A Programmer's Guide to Creating, Building and Maintaining a Web Presence," Prima Online, 1995, 721 pages.

Girdley et al., "Web Programming with Java," sams.net, 1996, 501 pages.

Shishir Gindavaram, "CGI Programming on the World Wide Web," O'Reilly and Associates Inc., Mar. 1996, 456 pages.

Eugene Eric Kim, "Master CGI Programming for the Internet," CGI Developer's Guide, sams.net, 1996, 514 pages.

Gordon McComb," JavaScript Sourcebook—Create Interactive JavaScript Programs for the World Wide Web," Wiley Computer Publishing, 1996, 741 pages.

Jeffrey C. Mogul, "Efficient Use of Workstations for Passive Monitoring of Local Area Networks," WRL Research Report 90/5, Wester Research Laboratory, Jul. 1990, 29 pages.

Timothy Jason Shepard, "TCP Packet Trace Analysis," Laboratory for Computer Science, Massachusetts Institute of Technology, Feb. 1991, 70 pages.

Scott A. Gile, "Reporting Application Usage in a LAN Environment," 1990, pp. 147-159.

Ncsa Mosaic History, "In the beginning there was NCSA http://www.ncsaxiuc.edu/news/mosaichisotyr/ on Jun. Mosaic . . . ," [retrieved from 12, 2006] Jun. 1993, 15 pages.

John Rodley, "Writing JAVA Applets," Internet Programming Series, Coriolis Group Books, 1996, 437 pages.

Peter Kent et al., "Official Netscape Java Script Book—The Nonprogrammer's Guide to Interactive Web Pages," 1996, 512 pages.

Patrick Naughton, "JAVA Handbook: The Authoritative Guide to the Java Revolutionary," 1996, 446 pages.

Ohn A. Pew, "Instant JAVA," The Sunsoft Press, 1996, 370 pages.

Aaron E. Walsh, "Foundations of Java Programming for the World Wide Web," IDG Books Worldwide, Inc., 1996, 915 pages.

Aaron E. Walsh, "JAVA for Dummies," IDG Books Worldwide, Inc., 1996, 389 pages.

Holman et al., "Instant JavaScript," Hewlett-Packard Professional Books, 1996, 418 pages. IDG Books Worldwide, Inc.

Cornell et al., "Core JAVA," The Sunsoft Press, 1996, 655 pages.

Davis et al., "Instant JAVA Applets," Ziff-Davis Press, 1996, 234 pages.

David Flanagan, "Deluxe Edition—Java in a Nutshell—Java 1.1," O'Reilly & Associates, Feb. 1996, 629 pages.

Cornell et al., "Core JAVA," The Sunsoft Press, Second Edition, 1997, 829 pages.

December et al., "HTML and CGI Unleashed," sams.net, 1995, 838 pages.

David Flanagan, "Java in a Nutshell," O'Reilly & Associates, Feb. 1996, 449 pages.

David Flanagan, "JavaScript: The Definitive Guide, Beta Edition," O'Reilly & Associates, Feb. 1996, 471 pages.

Anderson et al., "Next Generation Intrusion Detection Expert System (NIDES); Software Users Manual; Beta Update Release," SRI International, Dec. 1, 1994, 316 page.

Feliciano et al., "Lamprey: Tracking Users on the World Wide Web," Section on Medical Informatics, Stanford University, 1996, 5 pages.

"They Could Be Monitoring Your Every Web Move," GCN, Apr. 29, 1996, http:www.gcn.com, 3 pages.

Wu et al., "Virtual Proxy Servers for WWW and Intelligent Agents on the Internet," IEEE Computer Society, Proceedings of The Thirtieth Annual Hawaii International Conference on System Sciences, 1997, 10 pages.

Johnson et al., "Automatic Touring in a Hypertext System," Wayne State Univeristy, Computer Science Department, IEEE, 1993, 7 pages.

John E. Tolle, "Performance Measurement and Evaluation of Online Information Systems," Proceedings of the 1985 ACM Computer Science Conference, Mar. 12-14, 1985, 8 pages.

Abrams et al., "Multimedia Traffic Analysis Using CHITRA95," ACM Multimedia 95—Electronic Proceedings, Nov. 5-9, 1995, 17 pages.

McCanne et al., "The BSD Packet Filter: A New Architecture for User-Leverl Packet Capture," Lawrence Berkeley Laboratory, Dec. 19, 1992, 11 pages.

Hansen et al., "Automated System Monitoring and Notification with Swatch," LISA, Nov. 1-5, 1993, 9 pages.

"tcpdump—dump traffic on a network," retrieved from http://www.tcpdump.org/tcpdump_man.html on Jun. 12, 2006, 26 pages.

"Gwstat v1.1—generate graphs of httpd server traffic," public release 1994, retrieved from http://www.bubl.ac.uk///archive/internet/www/servers/gwstn6.htm on Jun. 12, 2006, 1 page.

Blythe et al., "Lynx Users Guide Version 2.3," retrieved from http://www.cse.unsw.edu.aulhelp/docflynx!lynx_help/Lynx_users_guide.html on Jun. 12, 2006, 12 pages.

Jon Finke, "Monitoring Usage of Workstations with a Relational Database," LISA, Sep. 19-23, 1994, 10 pages.

"Real Audio Server Adminstration and Content Creation Guide," Version 3.0, Progressive Networks, Inc., 1995-1996, 292 pages.

"Real Server Administration and Content Creation Guide," Version 4.0, Progressive Networks, Inc., 1995-1997, 366 pages.

Tapley et al., "The Official Gamelan Java Directory," EarthWeb, Ziff-Davis Press, 1996, 6 pages.

Girdley et al., "Web Programming with JAVA," sams.net, 1996, 9 pages.

Email from Paul Barber, May 3, 1996, 2 pages.

Catledge et al., "Characterizing Browsing Strategies in the World-Wide-Web," Computer Networks and ISDN Systems, Proceedings of the Third International World-Wide-Web Conference, Apr. 10-14, 1995, 10 pages.

Tradewinds: A monthly round-up of Internet coverage in trade and industry magazines, A publication of Baker Library, Harvard Business School, vol. 2, No. 5, May 1995, 11 pages.

(56) References Cited

OTHER PUBLICATIONS

Google Search, "java applet web monitoring," InfoTicker Java Applet, retrieved from http://groups.google.com/groilp/comp.infosysterns.www.announcelbrowse_threadlthreadlcc . . . On May 2, 2006, 2 pages.

Google Search, "java applet hit counter," Can u make a hit counter in a java applet?, retrieved from http://groups.google.cornlgroup/comp.lang.javalbrowse_thread/thread/f2a41d0cb5c8eee4/c8 . . . On May 2, 2006, 6 pages.

Gcogle Groups : comp.lang.javascript, retrieved beta.google.com/group/comp.lang.javascriptlbrowse_threadlthread/4874a9f9c . . . on Jun. 8, 2005, 4 pages.

Peter G. Neumann (Moderator), "Forum on Risks to the Public in Computers and Related Systems," ACM Committee on Computers and Public Policy, vol. 17, Issue 79, Feb. 23, 1996, 11 pages.

Kamba et al., "The Krakatoa Chronicle—An Interactive, Personalized, Newspaper on the Web," 1995, 15 pages.

File://P:P Drive Files\Clients\Nielsen-Netratings\Settled Cases\Sane Solutions, LLC\ . . . Dec. 21, 2006, 2 pages.

Richard A. McGrath, "The Tail-less Mouse," Computer Graphics World, vol. 11, Oct. 1988, 5 pages.

Paul Pallab, "Marketing on the Internet," Journal of Consumer Marketing, vol. 13, No. 4, 1996, 17 pages.

Martha K. Lobow, "An Engineer's Guide to Autocad," Industrial Engineering, vol. 19, No. 8, Aug. 1987, 6 pages.

Tom Dellecave, Jr., "The Net Effect," A Supplement to Sales and Marketing Management, Mar. 1996, 9 pages.

Sharon Zillmer, "How to Make Your Web Ads Pay Off," Marketing Magazine, vol. 101, Jun. 10, 1996, 4 pages.

Leah Haran, "PC-Meter Tracks Computer Uses," Advertising Age, Oct. 2, 1995, 4 pages.

Cove et al., "Online Text Retrieval Via Browsing," Informatio Processing and Management: An International Journal, vol. 24, No. 1, 1988, 10 pages.

Carmel et al., "Browsing in Hypertext: A Congnitive Study," IEEE Transactions on Systems, Man and Cybernetics, vol. 22, No. 5, Sep./Oct. 1992, 23 pages.

Gary Marchionni, "Information Seeking Strategies of Novices Using a Full-Text Electronic Encyclopedia," Journal of the American Society for Information Science, vol. 40, No. 1, Jan. 1989, 16 pages.

Tim Berners-Lee, "The World Wide Web Browser," http://www.w3.org/People/Bemers-Lee/WorldWideWeb.btml , May 24, 2006, 4 pages.

Yahoo! Search, Web Prpgramming > Access Counters in the Yahoo! Directory, http://dir.yahoo.com/Computers and IntemeuIntemet/World Wide_Web/ProgrammingAccess_Counters/ May 24, 2006, 3 pages.

Image of Compact Disc, Unica Corporation, Documents Responsive to *NetRatings, Inc.* v. *WebSideStory Inc. Subpeona*, Civil Action No. 06-CV-878 (LTS) (AJP), Videotaped Deposition of Gregory Doench dated Jun. 26, 2006, 1 page.

Image of Compact Disc, Unica Corporation, Documents Responsive to *NetRatings, Inc.* v. *WebSideStory Inc. Subpoena*, Civil Action No. 06-CV-878 (LTS) (AJP), 1 page.

NetAcuity IP Intelligence Whitepaper, "The Role of IP Intelligence in the Online World," Digital Envoy, 2002-2003, 10 pages.

Catledge et al., "Characterizing Browsing Strategies in the World Wide Web," The Third International WWW Conference, 1995, 9 pages.

Cunha et al., "Characteristics of WWW Client Based Traces," Computer Science Department, Boston University, Jul. 18, 1995, 18 pages.

James Staten, "Navigator Tricks Raise Concerns," MacWeek, vol. 10, No. 11, Mar. 18, 1996, 2 pages.

Saul Greenberg, "Using Unix: Collected Traces of 168 Users," Advanced Technologies, The Alberta Research Council, 1988, 14 pages.

Hilbert et al., "Agents for Collecting Application Usage Data Over the Internet," Department of Information and Computer Science, University of California, 1998, 9 pages.

Louis Desjardins, "Activity Monitor 1.1 User's Guide," 1994, 5 pages.

Pitkow et al., "Results From the Third WWW User Survey," Graphics, Visualization & Usability (GVU) Center, The World Wide Web Journal, vol. 1, No. 1, 1995, 10 pages.

Ariel Poler, "Improving WWW Marketing Through User Information and Non-Intrusive Communications," Proceedings of the Second WWW Conference, 1994, 4 pages.

Fuller et al., "Measuring User Motivation From Server Log Files," Usability Research, retrieved from http://'#WW.micro • soft.com/usability/webcoefiffler/fuller.htm, on Oct. 30, 2000, 15 pages.

Crovella et al., "Explaining World Wide Web Traffic Self-Similarity," Computer Science Department, Boston University, Technical Report, Oct. 12, 1995, 19 pages.

The HomeNet Project, "*HOMENET*:A Field Trial of Residential Internet Services," Carnegie Mellon University, Pittsburgh, PA 15213, Apr. 1995, http://homenet.hcii.cs.cmu.edu/progress1report 1.html, 14 pages.

Kraut et al., "HomeNet: A Field Trial of Residential Internet Services," retrieved from http://www.acm.org/sigchi/chi96/proceedings/papers/Kraut/rek_txthtm, 1996, 20 pages.

Siocih et al., "Computer Analysis of User Interfaces Based on Repetition in Transcripts of User Session," ACM Transactions of Information Systems, vol. 9, No. 4, Oct. 1991, 27 pages.

Gary Perlman, "Asynchronous Design/Evaluation Methods for Hypertext Environment," Hypertext '89 Proceedings, Nov. 1989, 21 pages.

Bieber et al.," Backtracking in a Multiple Window Hypertext Environment," Institute for Integrated Systems Research, ECHT '94 proceedings, Sep. 1994, 9 pages.

McKenzie et al., "An Empirical Analysis of Web Page Revisitation," Department of Computer Science, University of Canterbury, 2001, 7 pages.

"Using Norton pcANYWHERE for DOS," Symantec Corporation, 1994, 30 pages.

Rick Knoblaugh, "IOMON—Protected mode I/O port monitor," Programmer's Journal, vol. 9, No. 5, 1991, 6 pages.

Michael A. Abrams, "A Tool to Aid in Model Development and Validation," Systems Engineering—Retail Divison, NCR Corporation, 1986, 10 pages.

Kamba et al., "The Krakatoa Chronicle—An Interactive, Personalized, Newspaper on the Web," In Proceedings of the Fourth International World Wide Web Conference, 1995, 15 pages.

Lee et al., "Intelligent Agetns for Matching Information Providers and Consumers on the World-Wide-Web," Department of Computer Science, The University of Hong Kong, Proceedings of the Thirtieth Annual Hawaii Intemalional Conference on System Sciences, 1997, 11 pages.

Pitkow et al., "Using the Web as a Survey Tool: Results from the Secon WWW User Survey," Graphics, Visualization & Usability Center, College of Computing, Georgia Institute of Technology, 1994, 12 pages.

Chen et al., "Supporting Advertisement on Electronic Publications," IBM Technical Disclosure Bulletin, vol. 39, No. 8, Aug. 1996, 2 pages.

Tracking Web Advertising "Audience Tracking System for Electronic Newspapers," Telegrafix Communications, Inc., May 3, 1995, 3 pages.

Tracking Web Advertising "Study Faults Online Ads for Kids," FTC Probes, Rueters, Mar. 28, 1996, 3 pages.

Tracking Web Advertising "Advertising Models and Associated Software . . . ," Google Search, May 15, 1996, 5 pages.

Tracking Web Advertising "Goldmail Revolutionizes Internet Advertising," Google Search, Jul. 7, 1996, 4 pages.

Tracking Web Advertising "Goldmail thinks consumers should get Paid for reading Advertising!" Google Search, Jul. 7, 1996, 4 pages.

Google Search, "Java Project," retrieved from http://groups.google.com/group/comp.lang.java.programmerlbrowse_threadlthread/5430a3 . . . , on Apr. 12, 2006, 3 pages.

(56) References Cited

OTHER PUBLICATIONS

Pitkow et al., "A Simple Yet Robust Caching Algorithm Based on Dynamic Access Patterns," Graphics, Visualization & Usability Center College of Computing, Georgia Institute of Technology, 1994, 8 pages.
Pitkow et al., "Results from the First World-Wide-Web User Survey," Journal of Computer Networks and ISDN Systems, vol. 27, No. 2, GVU Technical Report, 1994, 15 pages.
Risks-List: Risks-Forum Digest, Monday Mar. 4, 1996 vol. 17 : Issue 83, 11 pages.
Glenn Fleishman, "Web Log Analysis: Who's Doing What, When? Part 2," Web Developers Magazine, vol. 2, No. 2, May/Jun. 1996, 4 pages.
Braun et al.," Applied Network Reseach: 1994 Annual Status Report," Applied Network Research San Diego Supercomputer Center and University of California, Apr. 19, 1995, 15 pages.
Peter Brueggeman, "Monitoring CDROM Usage," UCSD Scripps Institution of Oceanography Library, Laserdisk Professional, 2(6):44-48, Nov. 1989, 5 pages.
Bestavros et al., "Application-Level Document Caching in the Internet," In Proceedings of the Second Intl. Workshop on Services in Distributed and Networked Environments, 1995, 8 pages.
Berners-Lee et al., "Uniform Resource Locators," Network Working Group, RFC 1738, Dec. 1994, 23 pages.
Marcia Bates, "The Design of Browsing and Berrypicking Techniques for the Online Search Interface," Graduate School of Library and Information Science, University of California at Los Angeles, 1989, 19 pages.
Ousterhout et al., "A Trace Driven Analysis of the UNIX 4.2 BSD File System," Computer Science Division Electrical Engineering and Computer Sciences, University of California, Apr. 25, 1985, 30 pages.
Steven Glassman, "A Caching Relay for the World Wide Web," Systems Research Center, Digital Equipment Corporation, 1994, 10 pages.
Chankhunyhod et al., "A Hierarchical Internet Object Cache," Computer Science Department, Universities of S. California and Colordao, 1995, 11 pages.
Claffy et al., "Traffic Characteristics of the TI NSFNET Backbone," National Science Foundation, Joint Study Agreement with IBM, 1993, 11 pages.
HighBeam Research, "Harris Computer Systems and Webster Network Strategies Announce Alliance to Offer WWW Monitoring Capabilities Through Firewalls," Mar. 4, 1996, Business Wire, 5 pages.
Resonate, "Network Traffic Management, Database Traffic Management," 2005, 2 pages.
Google Groups, "Topic In comp_infosystems.www.authoring. html" retrieved from http://groups.google.com/group/comp. infosystems.www.authoring.html/browseMellon University, Pittsburgh, Pa 15213,thread/thread.dfbla837f29e165e/a0e0e6a131c6102d?q=acces . . . , on May 24, 2006, 3 pages.
Bernstein et al., "Architectures for Volatile Hypertext," Hypertext 91 Proceedings, Dec. 1991, 18 pages.
Matt's Script Archive: Book'em Dano: Readme, retrieved from file://P:\P Drive Files\CLIENTS\Nielsen-NetRatings\Settled Cases\Sane Solutions, LLC\ . . ., on Dec. 21, 2006, 3 pages.
Prakash Baskaran, "Gamelan Who's Who More Infor," http://web. archive.org/web/19961027024909/www.gamelan.com/person. cgi?id=PB3, 1996, 1 page.
Sukavirilya et al., "A Second Generation User Interface Design Environment: The Model and the Runtime Architecture," Sep. 1992, Graphics, Visualization & Usability Center, Georgia Institute of Technology, 10 pages.
RealNetworks, "Real System 5.0 Security Features Whitepaper," 1997, 10 pages.
Web Authoring FAQ, 1996-2005 by the Web Design Group, retrieved from file://P:\P Drive Files\CLIENTS \Nielsen-NetRatings\Settled Cases\Sane Solutions, LLC\ . . . , on Dec. 21, 2006, 59 pages.

RealServer Administration Guide Version 5.0, RealNetworks, Inc., 1995-1997, 262 pages.
Tcptrace—Official Homepage, http://www.tcptrace.org\, 1 page.
Cooley et al., "Web Mining: Information and Pattern Discovery on the World Wide Web," Department of Computer Science, University of Minnesota, 1997, 2 pages.
Bamshad Mobasher, "Introduction," 1997, retrieved from http://maya.cs.depaul.edu/-mobasher/webminer/survey/nodel.html, on Apr. 18, 2006, 2 pages.
Bamshad Mobasher, "A Taxonomy of Web Mining," 1997, retrieved from http://maya.cs.depaul.edu/-mobasher/webminer/survey/nodel.html, on Apr. 18, 2006, 1 page.
Bamshad Mobasher, "Web Content Mining," 1997, retrieved from http://maya.cs.depaul.edu/-mobasher/webminer/survey/nodel.html, on Apr. 18, 2006, 1 page.
Bamshad Mobasher, "Agent Based Approach," 1997, retrieved from htttp://maya.cs.depaul.edu/-mobasher/webminer/survey/nodel.html, on Apr. 18, 2006, 2 pages.
Bamshad Mobasher, "Database Approach," 1997, retrieved from http://maya.cs.depaul.edu/-mobasher/webminer/survey/nodel.html, on Apr. 18, 2006, 2 pages.
Bamshad Mobasher, "Web Usage Miner," 1997, retrieved from http://maya.cs.depaul.edu/-mobasher/webminer/survey/nodel.html, on Apr. 18, 2006, 2 pages.
Bamshad Mobasher, "Pattern Discovery Tools," 1997, retrieved from http://maya.cs.depaul.edu/-mobasher/webminer/survey/nodel.html, on Apr. 18, 2006, 1 page.
Bamshad Mobasher, "Pattern Analysis Tools," 1997, retrieved from http://maya.cs.depaul.edu/-mobasher/webminer/survey/nodel.html, on Apr. 18, 2006, 1 page.
Bamshad Mobasher, "Pattern Discovery from Web Transactions," 1997, retrieved from http://maya.cs.depaul.edu/-mobasher/webminer/survey/nodel.html, on Apr. 18, 2006, 1 page.
Bamshad Mobasher, "Preprocessing Tasks," 1997, retrieved from http://maya.cs.depaul.edu/-mobasher/webminer/survey/nodel.html, on Apr. 18, 2006, 1 page.
Bamshad Mobasher, "Data Cleaning," 1997, retrieved from http://maya.cs.depaul.edu/-mobasher/webminer/survey/nodel.html, on Apr. 18, 2006, 1 page.
"Hot Java Read Me and link to the software on SunSITE," SunSite Software Information and Technology, retrieved from http://www.ibiblio.org/hotjava/, on May 24, 2006, 1 page.
Bamshad Mobasher, "Transaction Identification," 1997, retrieved from http://maya.cs.depaul.edu/-mobasher/webminer/survey/nodel.html, on Apr. 18, 2006, 2 pages.
Bamshad Mobasher, "Path Analysis," 1997, retrieved from http://maya.cs.depaul.edu/-mobasher/webminer/survey/nodel.html, on Apr. 18, 2006, 1 page.
Bamshad Mobasher, "Association Rules," 1997, retrieved from http://maya.cs.depaul.edu/-mobasher/webminer/survey/nodel.html, on Apr. 18, 2006, 1 page.
Bamshad Mobasher, "Sequential Patterns," 1997, retrieved from http://maya.cs.depaul.edu/-mobasher/webminer/survey/nodel.html, on Apr. 18, 2006, 1 page.
Bamshad Mobasher, "Clustering and Classification," 1997, retrieved from http://maya.cs.depaul.edu/-mobasher/webminer/survey/nodel.html, on Apr. 18, 2006, 1 page.
Bamshad Mobasher, "Analysis of Discovered Patterns," 1997, retrieved from http://maya.cs.depaul.edu/-mobasher/webminer/survey/nodel.html, on Apr. 18, 2006, 1 page.
Bamshad Mobasher, "Visualization Techniques," 1997, retrieved from http://maya.cs.depaul.edu/-mobasher/webminer/survey/nodel.html, on Apr. 18, 2006, 1 page.
Bamshad Mobasher, "OLAP Techniques," 1997, retrieved from http://maya.cs.depaul.edu/-mobasher/webminer/survey/nodel.html, on Apr. 18, 2006, 1 page.
Bamshad Mobasher, "Data and Knowledge Querying," 1997, retrieved from http://maya.cs.depaul.edu/-mobasher/webminer/survey/nodel.html, on Apr. 18, 2006, 1 page.
Bamshad Mobasher, "Usability Analysis," 1997, retrieved from http://maya.cs.depaul.edu/-mobasher/webminer/survey/nodel.html, on Apr. 18, 2006, 1 page.

(56) References Cited

OTHER PUBLICATIONS

Bamshad Mobasher, "Discovery Techniques in Web Transactions," 1997, retrieved from http://maya.cs.depaul.edu/-mobasher/webminer/survey/nodel.html, on Apr. 18, 2006, 1 page.
Bamshad Mobasher, "Web Usage Mining Architecture," 1997, retrieved from http://maya.cs.depaul.edu/-mobasher/webminer/survey/nodel.html, on Apr. 18, 2006, 3 pages.
Bamshad Mobasher, "Research Directions," 1997, retrieved from http://maya.cs.depaul.edu/-mobasher/webminer/survey/nodel.html, on Apr. 18, 2006, 1 page.
Bamshad Mobasher, "Data Pre-Processing," 1997, retrieved from http://maya.cs.depaul.edu/-mobasher/webminer/survey/nodel.html, on Apr. 18, 2006, 1 page.
Bamshad Mobasher, "The Mining Process," 1997, retrieved from http://maya.cs.depaul.edu/-mobasher/webminer/survey/nodel.html, on Apr. 18, 2006, 1 page.
Bamshad Mobasher, "Analysis of Mined Knowledge," 1997, retrieved from http://maya.cs.depaul.edu/-mobasher/webminer/survey/nodel.html, on Apr. 18, 2006, 1 page.
Bamshad Mobasher, "Conclusion," 1997, retrieved from http://maya.cs.depaul.edu/-mobasher/webminer/survey/nodel.html, on Apr. 18, 2006, 1 page.
Bamshad Mobasher, "References," 1997, retrieved from http://maya.cs.depaul.edu/-mobasher/webminer/survey/nodel.html, on Apr. 18, 2006, 6 pages.
Bamshad Mobasher, "About This Document," 1997, retrieved from http://maya.cs.depaul.edu/-mobasher/webminer/survey/nodel.html, on Apr. 18, 2006, 1 page.
Roy Fielding, "wwwstat: HTTPd Logfile Analysis Software," Department of Information and Computer Science, University of California, Feb. 15, 2001, 3 pages.
Changes to wwwstat: httpd logfile analysis package, 1994, 1996 Regents of the University retrieved from http://ftp.ics.uci.edu/pub/websoftlwwwstat/Changes, on Jun. 12, 2006, of California, 4 pages.
Roy Fielding, "wwwstat—swnmarize www server (httpd) access statistics," University from http://ftp.ics.uci.edu/pub/websoftlwwwstat/wwwstat.htrnl, on Jun. 12, 2006, of California, retrieved 11 pages.
"tcpslice(S): extract pieces of/glue together . . . —Linux man page," retrieved from http://www.die.net/doc/linux/man8/tcpslice.8.html, on Jun. 12, 2006, 3 pages.
"tcpsl\ce—Linux Command—Unix Command," retrieved from http:/linux.about.com/library !cmd/blcmd18tcpslice.htm, on Jun. 12, 2006, 3 pages.
Weiler et al., "Usability Lab Tools: One year Later," CHI '94, Celebrating Independence, Conference Companion, 1994, p. 330.
Cunha et al., "Characteristics of WWW Client-Based Traces," Computer Science Department, Boston University, Jul. 18, 1995, 18 pages.
Ann Lynworth, "Tracking Home Page Hits: Reporting on User Access," Dr. Dobb's Journal, 1995, 11 pages.
Uni Kassel, FB16, Messtechnik Homepage. Fachgebiet Mefitechnik, Univ.-Prof. Dr. rer. nat. Wolf-Jiirgen Becker, Last Modified Sep. 20, 1996, 1 page.
Applets at Kassel, "Applets and Applications: Department of Engineering Measurement," retrieved from java@mt.e-technik.uni-kassel.de, last modified Aug. 27, 1996, 5 pages.
Applets in Kassel, "Applets and Applikationen: Fachgebiet Me8technik," retrieved from java@mt.e-technik.uni-kassel.de, last modified Aug. 27, 1996, 5 pages.
Applet Demos, Sep. 30, 1995-Nov. 22, 1995 form. java: 1 class, 4kByte, 1995, 2 pages.
Counter, by java@mt.e-technik-uni-kassel.de, 1996, 33 pages.
Diane Hackborn, "Java Enhanced Communication Tools," Gamelan Earthweb, Jun. 11, 1996, 7 pages.
Marc Wandschneider, "ActiveX Controls Framework: Sample Code for Authoring Non-MFC Controls," Microsoft Corporation, Apr. 1996, 15 pages.
Google Search for Garrett Casey, Google Groups: comp.infosystems.www.authoring.cgi, Sep. 19, 1996, 2 pages.
Google Search for Garrett Casey Counter, Google Groups: misc.entrepreneurs, Jul. 2, 1996, 3 pages.
Dave Raggett, "HTML 3.2 Reference Specification," Jan. 14, 1997, 49 pages.
Berners-Lee et al., "Hypertext Transfer Protocol—HTTP/1.0," Network Working Group, RFC 1945, May 1996, 57 pages.
Michael McGee, "Web Pages: A Programmer's Perspective," Jun. 10, 1996, http://www.dfpug.com/loseblatsammlung/migration/whitepapers/webpages.htm, 14 pages.
Brian Wilson, "OPERA," Index DOT Html/Css, retrieved from http://www.blooberry.com/indexdotlhistory/opera.htm, on May 24, 2006, 3 pages.
David Beckett, "Combined Log System," Computing Laboratory, University of Kent, 1995, retrieved from http://www.hensa.ac.uk/parallel/www/djbl.html, on May 24, 2006, 8 pages.
Viktor Mayer-Schonberger, "The Internet and Privacy Legislation: Cookies for a Treat?" retrieved from http://web.arcbive_org/web/19990203034203/www. wvjolt. wvu.edu/wvjolVcurrentlissue 1 /articles/mayer/ . . . , on May 24, 2006, 7 pages.
Justin A. Boyan, "The Anonymizer Home Page," Sep. 1, 1995, retrieved from http://web.archive.org/web/19990208003332m1/anonymizer.cs.cmu.edu:8080/, on May 24, 2006, 1 page.
Gerald M. O'Connell, "A New Pitch," Moden Media, May 1995, 8 pages.
John Nardone, "The Modem Media Internet Research and Involvement Scale (IRIS)," Modem Media, Feb. 1995, 3 pages.
John Houston, "A Vision of Advertising Technology—How it Will Work," Modem Media, Aug. 1994, 6 pages.
Screen Shots of Windows NT 3:1, retrieved from http://www.cs.unid,edulhcil/muiseum/systemslwinnt3lsrc.html, on Jun. 7, 2005, 4 pages.
Aaron Johnson, "Implementation Guide," HBX on Demand Web Analytics, WebSideStory, Inc., 2006, 15 pages.
WebSideStory and AIG, screenshots, Jun. 22, 2005, 10 pages.
Joseph A. Bank, "Java Security," Dec. 8, 1995, http://net.ai.mit.edu/~jbank/javapaper/javapapre.html, 11 pages.
Prof. Dr. rer. oat. Wolf-Jfirgen Becker, "Department of Engineering Measurement," UN1 Kassel, FB16, Engineering Measurement, Last Modified Sep. 20, 1996, webmaster@mt.e-technik.uni-lwssel.de, 1 page.
Google Search, "Access Counters," Google Groups: comp.infosystems.www.authoring.html, Jun. 13, 1995, 3 pages.
"Logging Control in W3C httpd," retrieved from http://www.w3.org/Daemon/User/Config/Logging.html, on May 24, 2006, 3 pages.
"NetScape History," retrieved from http://www.holgennetzger.de/Netscape_History.html, on May 24, 2006, 4 pages.
Applets at Kassel, "Applets and Applications: Department of Engineering Measurement," Last Modified Dec. 12, 1996, retrieved from http://web.archive.orgfweb/19970802020436/http://www.uni-kassel.de/fb16/ipm/mVjavaljavae.html, on May 24, 2006, 6 pages.
Dean et al., "Security Flaws in the HotJava Web Browser," Department of Computer Science, Princeton University, Nov. 3, 1995, 8 pages.
Scott Weston, "Netscape 2.0b2 Allows for Invasion of Privacy," Dec. 2, 1995, retrieved from http://www.tbf.com/resource/b2-privacy-bug-html, on May 24, 2006, 2 pages.
Henrik Frystyk Nielsen, Classic HTTP Documents, retrieved from http://www. w3.org/Protocols/Classic.html, on May 24, 2006, 1 page.
Google Search: Javascript, "JavaScript in Netscape 2.0 Shouldn't let me do this," Google Groups: comp.society.privacy Feb. 23, 1996, 3 pages.
Hallman et al., "Extended Log File Format: WJC Working Draft WD-logfile-960323," retrieved from http://www.wJ.org/pubfWW-WffR/WD-logfile-960323 html, on May 24, 2006, 6 pages.
"Computer Privacy Digest V8#024," Computer Privacy Digest Moderator, Mar. 17, 1996, http://web.archive.org/web/20000829051834/itu.rdg.ac.uklmisc/Mailing__Lists/cpd/00000002.htm, 19 pages.
Google Search: javascript exploit, "Netscape 2.0 Javascript Security Concerns," Google Groups: comp.sys.mac misc, Mar. 1, 1996, 3 pages.

(56) References Cited

OTHER PUBLICATIONS

Google Search: javascript counter script, "Simple Event Counter," Apr. 17, 1996, 2 pages.
"Older History of Changes . . . " Counter was re-released Aug 7, 1995, retrieved from http://www.ualberta.ca/GEO/Counter.History.html, on May 24, 2006, 8 pages.
Dan Connolly, "A Little History of the World Wide Web (1945-1995)," Webmaster, 1995, 6 pages, retrieved from http://www.w3.org/History.html, on May 24, 2006.
Information Operations Timeline, retrieved from http://www.j fsc.ndu.edu/schools programs/jciwsliw/iotimeline.asp, on May 24, 2006, 9 pages.
Tim Berners-Lee, "Information Management: A Proposal," CERN, Mar. 1989, May 1990, retrieved from http://www.w3.org/History/1989/proposal.html, on May 24, 2006, 14 pages.
Google Search: xferstats, "uutraf—UUCP statistics for HoneyDanBer," Google Groups: alt.sources, Nov. 5, 1989, 10 pages.
Berners-Lee et al., "World Wide Web: Proposal for a HyperText Project," Nov. 12, 1990, 7 pages.
World Wide Web for C5 Presentation, retrieved from http://www.w3.org/Talks/C5_17_May_91.html, on May 24, 2006, 1 page.
"Change History for httpd," retrieved from http://www.w3.org/Daemon/Features.html on May 24, 2006, 15 pages.
"WWW Talk 1991 Archives," Last Modified Dec. 13, 1991, 1 page, retrieved http://ksi.cpsu,ucalgary.ca/archives/WWW-TALK/www-talk-12991.index.html, on from May 24, 2006.
CERN Computer News Letter13 CER.N-CNL-1991-204, IT Division, vol. XXVI, Issue No. 3, Last Updated Jul. 6, 2000, retrieved from http://ref.web.cem.ch/ref/CERN/CNUI99.1/204/, on May 24, 2006, 2 pages.
"HyperText Transfer Protocol Design Issues," retrieved from http://www.wJ.orgfProtocols/Designless.html, on May 24, 2006, 3 pages.
"An updated quick look at Viola WWW," retrieved from http://www.w3.org/History/19921103-hypertextlhypertext/Viola/Review.html, on May 24, 2006, 2 pages.
"The World Wide Web project," retrieved from http://www .w3.org/History/19921103-hypertextlhypertext/WWW/TheProjecthtml, on May 24, 2006, 1 page.
"Demonstrations—nENC92," retrieved from http://www.w3.org/Conferences/JENC92/Demonstrations.htrnl, on May 24, 2006, 1 page.
World-Wide Web Servers, "W3 servers," retrieved from http://www.w3.org/History/19921103-hypertext/hypertext/DataSources/WWW /Servers.html, on May 24, 2006, 2 pages.
"Basic HTTP as defined in 1992: A protocol for :networked information," retrieved from http://www.w3.org/Protocols!HTfP/HTTP2.html, on May 24, 2006, 2 pages.
Michael Grobe, "An Early History of Lynx: Multidimensional Collaboration," Apr. 10, 1997, retrieved from http://people.cc.ku.edu/-grobelearly:lynx.html, on May 24, 2006, 8 pages.
Presentation ofWww to Online Publishing 93, "World Wide Web," retrieved from http://www.w3.org/Talks/OnlinePublishing93/0verview.html, on May 24, 2006, 1 page.
John Thomson, Jr., "Creation of the NSFnet," Commercialization of the Internet, retrieved from http://johntlwmson.org/j56I/NSFcreate-4.html, on May 24, 2006, 2 pages.
John Thomson, Jr., "The Beginning of Commercialization fo the NSFnet," Commercialization of the Internet, retrieved from http://johntlwmson.org/j561/NSFcomm-5.html, on May 24, 2006, 1 page
John Thomson, Jr., "Criticism of the NSF grows," Commercialization of the Internet, retrieved from http://johntlwmson.org/j56I/NSFcriticism-6.html, on May 24, 2006, 1 page.
John Thomson, Jr., "The NSF Starts to Change Their Policy," Commercialization of the Internet, retrieved from http://johntlwmson.org/j56I/NSFpolicy-7.html, on May 24, 2006, 1 page.
John Thomson, Jr., "Changes in NSF Policy Become Law—The internet is Commercialized," Commercialization of the Internet, retrieved from http://johntlwmson.org/j56I/NSFlaw-9.html, on May 24, 2006, 1 page.

Browser History timeline: Overview, "Browser Timelines," retrieved from http://www.blooberry;com/indexdotlhistorylbrowsers6.htm, on May 24, 2006, 3 pages.
Tony Sanders, "plesux log file summaries," retrieved from http://ksi.cpsu.ucalgary.ca/archives/WWW-TALK/www-talk-1992q2.messages/563.html, on May 24, 2006, 4 pages.
W3 Project—Assorted Design Notes, "Working Notes," retrieved from http://www.w3.org/History/1994/WWW/WorkingNotes/Overview.html, on May 24, 2006, 2 pages.
Google Search: fwgstat, "Looking for a GN Log," Google Groups: comp.infosystems.gopher, Oct. 7, 1993, 3 pages.
Google Search: fwgstat, "Single Program to Summarize Logs of Several Kinds of Server?" Google Groups: comp.infosystems.gopher, Jan. 6, 1994, 10 pages.
Google Search: getsites, "Announcing getsites 1.5, a Web Log Analyzer," Google Groups: comp.infosystems.www, Nov. 3, 1993, 2 pages.
Google Search: wwwstat, "Announcing wwwstat-0.1—an access log summary program," Google Groups: comp.infosystems.www, Jan. 15, 1994, 8 pages.
Google Search: wusage 1.0, "WUSAGE 1.0: Server Usage Graphs, Top Ten . . . " Google Groups: comp.infosystems.www, Jan. 31, 1994, 2 pages.
Google Search: getstats, "Announcing getstats 1.0, a web log analyzer," Google Groups: comp.infosystems.www, Feb. 1, 1994, 3 pages.
"First International Conference on the World-Wide-Web," May 25-27, 1994, CERN, retrieved from http://www94.web.cem.ch/WWW94/, on May 24, 2006, 2 pages.
Tim Berners-Lee, "Plenary at WWW Geneva 94," slides from first International World Wide Web Conference, retrieved from http://www.w3orgffalksiWWW94Tim/, on May 24, 2006, 4 pages.
Mosaic Communications Changes Name to "Netscape Communications Corporation" Netscape Communications News Release, retrieved from http://www.holgermetzger.de/netscape/NetscapeCommunicationsNewsRelease.htm, on May 24, 2006, 2 pages.
Google Search: cgi hit counter, "WWW hit counter: does this work?" Google Groups: comp.larig.perl, Dec. 7, 1994, 7 pages.
"Welcome to Netscape," 1994, Mosaic Communications Corporation, retrieved from http://www.hnehosting.com/mirrors/Origin_of_a_Browser/mcom.1 0.1994/homeJwelcome.htrnl, on May 24, 2006, 2 pages.
ibiblio history, the public's library and digital archive, retrieved from http://www.ibiblio.org/history/, on May 24, 2006, 10 pages.
Google Search: cgi git counter, "Hit Counter," Googie Groups: comp.infosystems.www.users, Mar. 29, 1995, 2 pages.
The Third International World-Wide Web Conference, Technology, Tools and Applications, Apr. 10-14, 1995. Darmstadt, Germany, retrieved from http://www.igd.fhg.de/archive/1995_www95/, on May 24, 2006, 1 page.
WWW Homepage Access Counter and Clock!, retrieved from http://www.muquit.com/muquillsoftware/Coun!/Count.html, on May 24, 2006, 32 pages.
Javapage, JAVA, retrieved from http://web.archive.org/web/20040712072256/http://www.groton.k12.ct.us/WWW/fsr/student/Spring02/W . . . , on May 24, 2006, 4 pages.
Google Search: hit counter, "Access Counters . . . " Google Groups: comp.infosystems.www.authoring.html, Jul. 3, 1995, 7 pages.
"CGI: Common Gateway Interface," retrieved from http://www.w3.org/CGII, on May 24, 2006, 2 pages.
"Computers and the Internet," Earth Station 9, retrieved from http://www.earthstalion9.com/counters.htm, on May 24, 2006, 2 pages.
(2.4.02)—EXCALXBUR BBS, "2.4-Windows Based Only Internet BBS Software—The Official BBS Faq," retrieved from http://www.sysopworld.comlbbsfaqlch02.2.4.htm, on May 24, 2006, 23 pages.
Crazy Counter, GIF89a version, Last Modified Mar. 8, 1996, 2 pages.
Crazy Counter, (GIF89a) Last Modified Mar. 8, 1996, 2 pages.
CrazyCounter.Java, 1996 Mark Boyns boyns@sdsu.edU, 5 pages.
"Horace's Java: Page View Timer Demo," Page View Timer Applet, 1995-2005 by 1wv.Software, Last Modified Aug. 7, 1999, 2 pages.

(56) References Cited

OTHER PUBLICATIONS

JavaWorld, Apr. 1996, http://www.javaworld.com, 1 page.
1996 Java World editorial calendar, Feb. 26, 1996, 2 pages.
JavaWorld, Mar. 8, 1996, http://www.javaworld.com, 1 page.
Sun and Netscape Announce Javascript, "Javascript Announcement. txt," Dec. 4, 1995, 8 pages.
Yermo Lamers, "webthreads Announcement.txt," Oct. 8, 1996, 5 pages.
McGraw et al., "Untangling the Woven Web: Testing Web-based Software," Reliable Software Technologies Corporation, Apr. 1, 1996, 9 pages.
Shiniji Tanaka, The Developer of Multimedia Business (the 23rd), Business Communication, Japan, Business Communication Corporation, Feb. 1, 1998, vol. 35, No. 2, pp. 116-123—Cited on Japanese Patent Office "Notice of Reasons for Rejection" issued on Sep. 6, 2010, Translation of Japanese Notice cited as NPL 2 in Information Disclosure Statement filed on Feb. 28, 2013.
Japanese Patent Office, "Notice of Reasons for Rejection," issued in Japanese Patent Application No. 2001-552567 on Oct. 20, 2011 (5 pages).
Japanese Patent Office, "Notice of Reasons for Rejection," issued in Japanese Patent Application No. 2001-552567 on Sep. 6, 2010 (8 pages).
Ryoji Koike, "Coming of the era of Post banner Internet advertising strategy change," Internet magazine, Japan, Impress Inc., Sep. 1, 1999, No. 56 (5 pages).
Patent Cooperation Treaty, "International Search Report," issued by the International Searching Authority in connection with PCT application No. PCT/US2000/029352, mailed Apr. 18, 2001 (1 page).
Patent Cooperation Treaty, "Written Opinion," issued by the International Preliminary Examining Authority in connection with PCT application No. PCT/US2000/029352, mailed May 8, 2002 (4 pages).
Patent Cooperation Treaty, "International Preliminary Examination Report," issued by the International Preliminary Examining Authority in connection with PCT application No. PCT/US2000/029352, mailed Jul. 9, 2002 (3 pages).
European Patent Office, Supplementary European Search Report, issued in connection with EP Application No. 00980233.1, issued Jun. 25, 2009, 4 pages.
Franklin M K et al, "Auditable metering with lightweight security", Published by the author at Financial Cryptography, International Conference, Feb. 24, 1997, 13 pages.
European Patent Office, Communication under 71(3) EPC, regarding Notice of Intent to Grant and claims for grant, issued in EP Application No. 00 980 233.1-2416, issued Jun. 25, 2009, 13 pages.
Perrone et al. "Enterprise Application Platforms", Chapter 34, Building Java Enterprise Systems With J2EE, 6/00, pp. 1191-1206.
Perrone et al. "Modeling Components with Enterprise JavaBeans", Chapter 36, Building Java Enterprise Systems With J2EE, 6/00, pp. 1231-1314.
Perrone et al. "Enterprise Application Integration", Chapter 38, Building Java Enterprise Systems With J2EE, 6/00, pp. 1355-1372.
Reynolds "Starting Our Site", Chapter 2, Beginning E-Commerce With Visual Basic, ASP, SQL Server 7.0 and MTS, 2000 Wrox Press, pp. 21-39.
Reynolds "Building the Object Model", Chapter 3, Beginning E-Commerce With Visual Basic, ASP, SQL Server 7.0 and MTS, 2000 Wrox Press, pp. 41-84.
United States Patent and Trademark Office, "Office Action," issued in connection with U.S. Appl. No. 09/695,216, on Nov. 4, 2003, 10 pages.
United States Patent and Trademark Office, "Office Action," issued in connection with U.S. Appl. No. 09/695,216, on May 3, 2004, 12 pages.
United States Patent and Trademark Office, "Office Action," issued in connection with U.S. Appl. No. 09/695,216, on Nov. 4, 2005, 15 pages.
United States Patent and Trademark Office, "Office Action," issued in connection with U.S. Appl. No. 09/695,216, on Nov. 17, 2006, 12 pages.
United States Patent and Trademark Office, "Office Action," issued in connection with U.S. Appl. No. 09/695,216, on Jun. 7, 2007, 30 pages.
United States Patent and Trademark Office, "Office Action," issued in connection with U.S. Appl. No. 09/695,216, on Nov. 13, 2007, 84 pages.
United States Patent and Trademark Office, "Office Action," issued in connection with U.S. Appl. No. 09/695,216, on Jul. 15, 2011, 42 pages.
United States Patent and Trademark Office, "Office Action," issued in connection with U.S. Appl. No. 09/695,216, on Feb. 16, 2012, 30 pages.
United States Patent and Trademark Office, "Notice of Allowance," issued in connection with U.S. Appl. No. 09/695,216, Nov. 30, 2012, 21 pages.
United States Patent and Trademark Office, "Notice of Allowance," issued in connection with U.S. Appl. No. 09/695,216, May 23, 2013, 41 pages.
United States Patent and Trademark Office, "Notice of Allowance," issued in connection with U.S. Appl. No. 09/695,216, Oct. 4, 2013, 86 pages.
"Nokia Launches WAP Toolkit 2.1 with New Mobile Phone Emulators, Additional Functionality for Developers, and a New API for Integration with Third-Party Development Environments," Feb. 6, 2001 [retrieved from http://company.nokia.com/en/news/press-releases/2001/02/06/nokia-launches-wap . . . , on Dec. 22, 2014] 4 pages.
International Bureau, "International Preliminary Report on Patentability," issued in connection with PCT application Serial No. PCT/US2008/056040, issued Nov. 17, 2009 (6 pages).
Patent Cooperation Treaty, "International Search Report," issued by the International Searching Authority in connection with related PCT application No. PCT/US2008/056040, mailed Nov. 10, 2008 (2 pages).
Patent Cooperation Treaty, "Written Opinion of the International Searching Authority," issued by the International Searching Authority in connection with related PCT application No. PCT/US2008/056040, mailed Nov. 10, 2008 (5 pages).

* cited by examiner

SYSTEM AND METHOD FOR ESTIMATING PREVALENCE OF DIGITAL CONTENT ON THE WORLD-WIDE-WEB

CROSS-REFERENCE TO RELATED APPLICATIONS

This is a continuation of U.S. patent application Ser. No. 09/695,216, filed on Oct. 25, 2000, which claims the benefit of U.S. Provisional Patent Application No. 60/231,195, filed Sep. 7, 2000, and U.S. Provisional Patent Application No. 60/175,665, filed Jan. 12, 2000, all of which are hereby incorporated herein by reference in their entireties.

FIELD OF THE INVENTION

The present invention relates generally to a system, method, and computer program product for tracking and measuring digital content that is distributed on a computer network such as the Internet. More particularly, the present invention relates to a system, method, and computer program product that collects online advertisement data, analyzes the data, and uses the data to calculate measurements of the prevalence of those advertisements.

BACKGROUND OF THE INVENTION

The increase in the popularity of the Internet and the World-Wide-Web ("Web") is due, in part, to the interactive technologies that a Web page can employ. These interactive technologies directly affect the Web as an advertising medium because the technologies introduced new advertising formats such as fixed icon sponsorship advertisements, rotating banners and buttons, and interstitial advertisements (i.e., online advertisements that interrupts the user's work and takes over a significant percentage of the screen display). Even though the creation of the advertisement is different, the affect on the viewer is similar to traditional advertising. For example, a banner advertisement or logo icon on a Web page creates an impression of the product for the viewer that is equivalent to a traditional billboard advertisement that promotes a product by presenting the brand name or slogan. Similarly, a sponsor's logo on a Web page creates an impression of the sponsor for the viewer that is equivalent to seeing a sponsor logo on the scoreboard at a college basketball game.

The rapid and volatile growth of the Internet over the last several years has created a high demand for quality statistics quantifying its magnitude and rate of expansion. Several traditional measurement methodologies produce useful statistics about the Internet and its users, but the complexity of the Internet has left some of these methodologies unable to answer many important questions.

Online advertising is one area where traditional methodologies do not lend well to measurement. Each day, thousands upon thousands of electronic advertisements appear and then disappear from millions of Web pages. The transitory nature of online advertising activity warrants a novel methodology to accurately measure advertising activity.

Existing advertisement tracking and measurement systems automate the collection of Web pages, but fail to automate the collection of the online advertisements. Since the content of an online advertisement changes or rotates over time, accurate reconstruction of the frequency of specific advertisements requires continuous sampling of relevant Web pages in the correct proportions. Furthermore, due to the sheer size of the Web, sampling algorithms must be finely tuned to optimize the allocation of resources (i.e., network bandwidth, database storage, processor time, etc.) and simultaneously enable maximum Internet coverage. The existing advertisement tracking and measurement systems fail to meet these needs because they are not optimized for resource allocation and do not continuously sample relevant Web pages in the correct proportion.

In view of the deficiencies of the existing systems described above, there is a need for an advertisement tracking and measurement system that uses resources more intelligently, is friendlier to the Web sites that it visits, is scalable, and produces accurate measurements. The invention disclosed herein addresses this need.

SUMMARY OF THE INVENTION

The present invention is a system, method, and computer program product for tracking and measuring digital content that is distributed on a computer network such as the Internet. The system collects online advertisement data, analyzes the data, and uses the data to calculate measurements of the prevalence of those advertisements.

In the preferred embodiment, traffic data from a variety of sources and complimentary methodologies fuels the traffic analysis system, an intelligent agent (i.e., software that interact with, learn from, and adapt to an environment). The traffic analysis system processes raw traffic data by cleansing and summarizing the traffic data prior to storing the processed data in a database. When the statistical summarization system calculates the advertising frequency, impressions, and spending, it relies upon the processed data from the traffic analysis system.

The advertisement sampling system, also known as the "prober" or "Cloudprober", uses a robust methodology that continually seek out the most significant and influential Web sites to probe (i.e., monitor). Moreover, the site selection and definition performed by the present invention dictates the Web pages that comprise each Web site to ensure that complete, singularly branded entities are reported as such. The advertisement sampling system uses intelligent agent technology to retrieve Web pages at various frequencies to obtain a representative sample. This allows the Cloudprober to accurately assess how frequently each advertisement appears in the traffic data. After the Cloudprober fetches a Web page, the advertisement sampling system extracts the advertisements from the Web page. In the preferred embodiment, the advertisement extractor, also known as the "extractor", invokes an automatic advertisement detection ("AAD") process, a heuristic extraction process, to automatically extract all of the advertisements from the Web page.

Following extraction of the advertisements from the Web page, the advertisement sampling system invokes a classification engine to analyze the advertisement fragments. The classifier processes each fragment to determine a classification for the fragment and then stores the fragment and classification data in a database. The result of the analyses and processing performed by the advertisement sampling system is a rich catalog of advertising activity that can be easily queried by a client.

The present invention uses a Web front end and user interface to access and update the data in the database. The Web front end provides a client, or user, of the present invention with a query interface to the database populated by the traffic analysis, advertisement sampling, and the statistical summarization systems. The user interface is a graphical user interface that includes a separate component for system account management, site administration, taxonomy administration, advertising content classification, and rate card collection. The user interface allows an account manager and operator to maintain and administer the present invention. The user interface also allows a media editor to review the data in the database to verify the accuracy and integrity of the vast amount of data collected by the present invention. This data integrity process routinely investigates unusual or outlying data points to calibrate the system and adapt it to an ever-changing environment.

BRIEF DESCRIPTION OF THE DRAWINGS

The accompanying figures best illustrate the details of the present invention, both as to its structure and operation. Like reference numbers and designations in these figures refer to like elements.

DETAILED DESCRIPTION OF THE INVENTION

Figure 1:
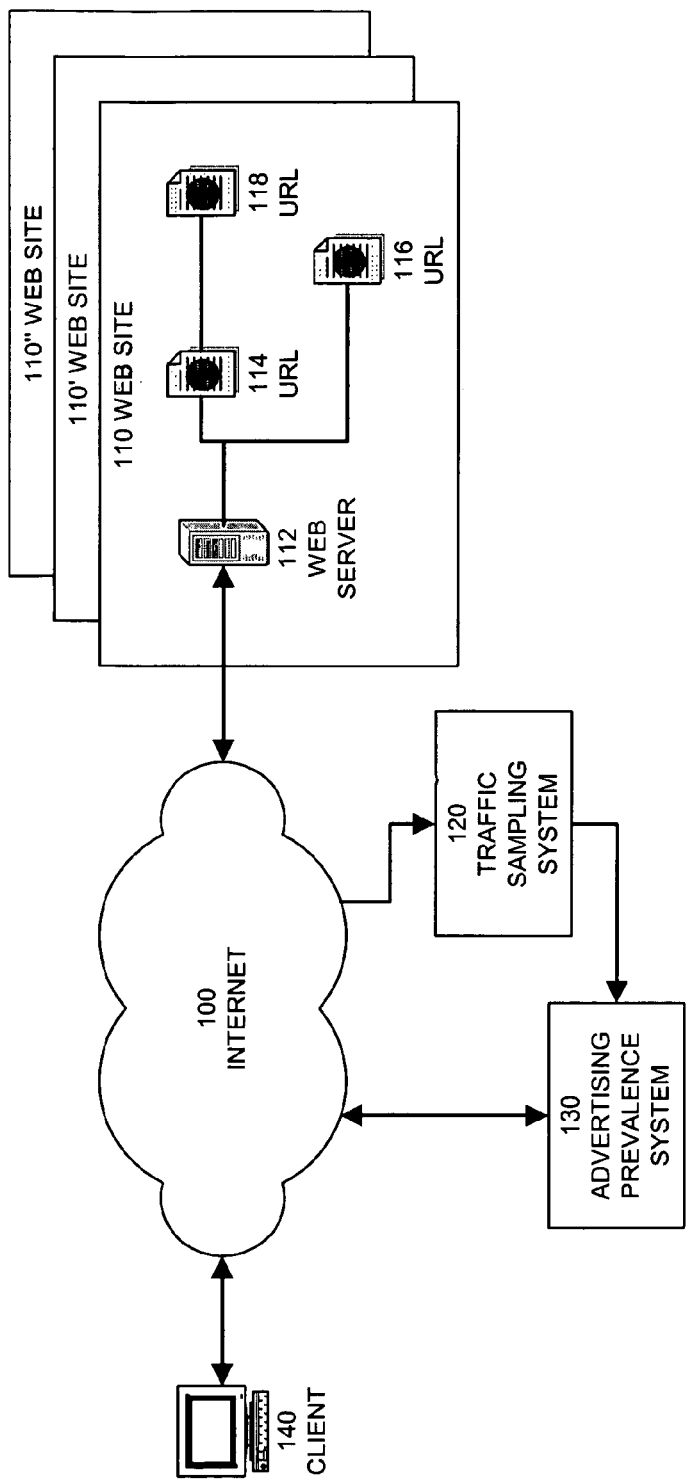
FIG. 1 is a network diagram depicting the environment for an advertising prevalence system according to the present invention.

FIG. 1 depicts the environment for the preferred embodiment of the present invention that includes the Internet 100, and a Web site 110, traffic sampling system 120, advertising prevalence system 130, and client 140. The present invention uses intelligent agent technology to gather data related to the attributes, placement, and prevalence of online advertisements. This data provides a user with up-to-date estimates of advertisement statistics and helps the user to gain a competitive advantage.

As shown in FIG. 1, the Internet 100 is a public communication network that allows the traffic sampling system 120 and advertising prevalence system 130 to communicate with a client 140 and a Web site 110. Even though the preferred embodiment uses the Internet 100, the present invention contemplates the use of other public or private network architectures such as an intranet or extranet. An intranet is a private communication network that functions similar to the Internet 100. An organization, such as a corporation, creates an intranet to provide a secure means for members of the organization to access the resources on the organization's network. An extranet is also a private communication network that functions similar to the Internet 100. In contrast to an intranet, an extranet provides a secure means for the organization to authorize non-members of the organization to access certain resources on the organization's network. The present invention also contemplates using a network protocol such as Ethernet or Token Ring, as well as, proprietary network protocols.

The traffic sampling system 120 is a program that monitors and records Web activity on the Internet 100. The traffic sampling system 120 is an intermediary repository of traffic data between a Web surfer (not shown) on the Internet 100 and a Web server 112. The Web server 112 shown in FIG. 1 is a conventional personal computer or computer workstation that includes the proper operating system, hardware, communications protocol (e.g., Transmission Control Protocol/Internet Protocol), and Web server software to host a collection of Web pages. The Web surfer (not shown) communicates with the Web server 112 by requesting a Uniform Resource Locator ("URL") 114, 116, 118 associated with the Web site 110, typically using a Web browser. Any program or device that can record a request for a URL made by a Web surfer (not shown) to a Web server 112 can perform the functions that the present invention requires of the traffic sampling system 120. The traffic sampling system 120 then aggregates the traffic data for each Web site 110 for use by the advertising prevalence system 130.

The present invention can use any commercially available traffic sampling system that provides functionality similar to the Media Metrix audience measurement product. Other possible mechanisms to obtain a traffic data sample include:

1. "Proxy Cache Sampling" gathers data such as user clickstream data, and Web page requests from a global distributed hierarchy of proxy cache servers. This data passes through an intermediate mechanism that provides pre-fetch and caching services for Web objects. As of May 1999, traffic statistics calculated by the present invention represent the distillation of raw data from nine first-tier and approximately 400 second-tier caches in the United States, as well as an additional 1100 worldwide.

2. "Client-Side Panel Collection" retrieves sample data from each panelist via a client-side mechanism and transfers that data to a collection repository. The client-side mechanism may monitor the browser location bar, user browser, a client-side proxy, or TCP/IP stack hooks.

3. A "Transcoder" is a proxy that rewrites HTML, usually for the purpose of adding elements for generation of advertisement revenue or page headers/footers. Free Internet service providers ("ISPs") typically use this technique.

4. Any content distribution mechanism that replicates Web page or site content in a manner meant to ease network congestion or improve user experience.
5. Any content filtering mechanism that evaluates requests for URLs and takes actions to allow or disallow such requests.
6. From server logs maintained by Internet service providers ("ISPs") or individual Web sites.

Figure 2:
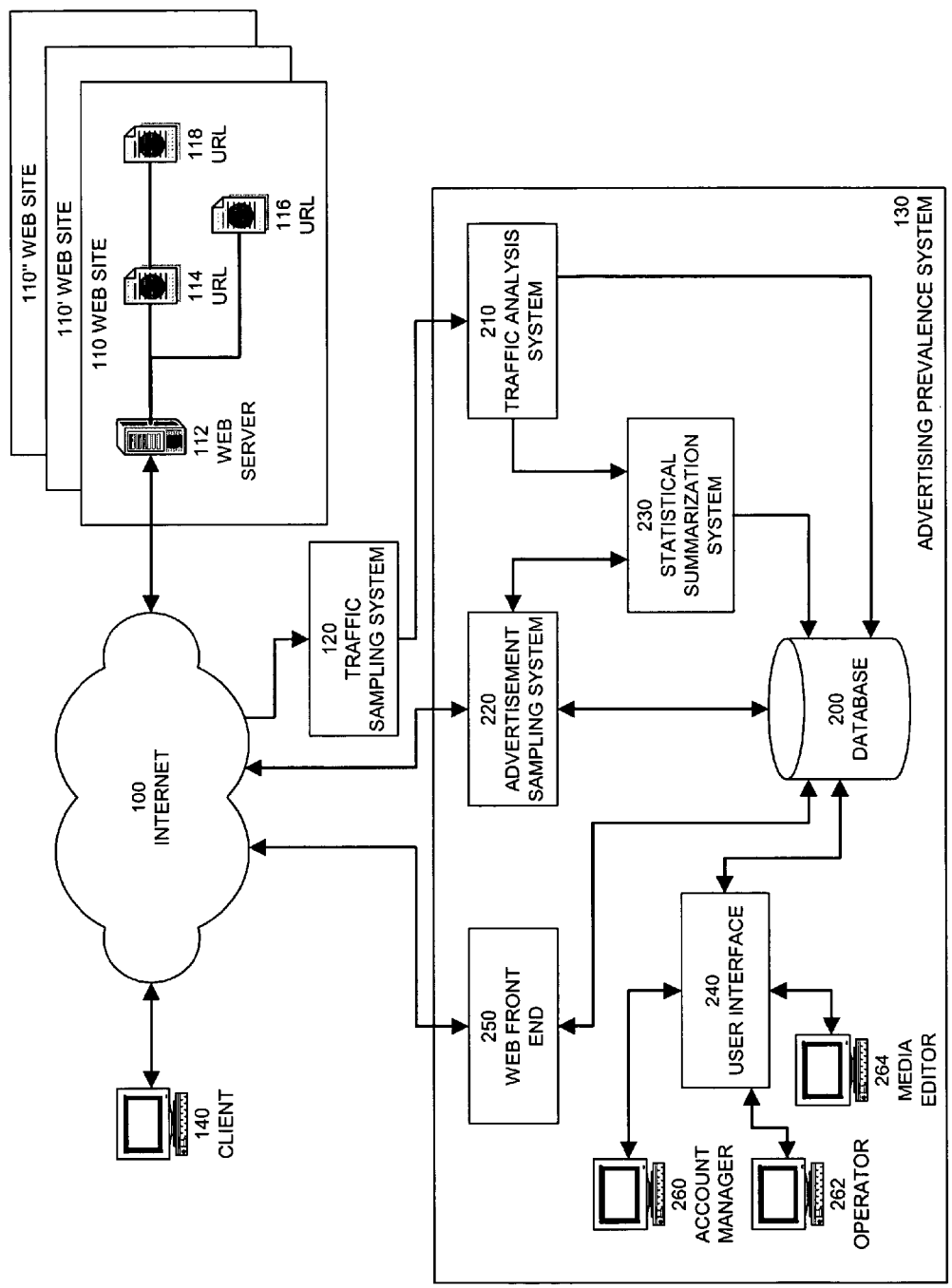
FIG. 2 depicts the network diagram of FIG. 1, in greater detail, to show the relationships between the network environment and the elements that comprise the advertising prevalence system.

FIG. 2 expands the detail of the advertising prevalence system 130 in FIG. 1 to show the relationships between the network environment and the elements that comprise the advertising prevalence system 130. The advertising prevalence system 130 includes a traffic analysis system 210, advertisement sampling system 220, and statistical summarization system 230 that communicate data to the database 200 for storage. The account manager 260, operator 262, and media editor 264 can access the database 200 through the user interface 240 to perform administrative functions. The client 140 can access the database 200 through the Web front end 250.

The traffic analysis system 210 receives raw traffic data from the traffic sampling system 120. The traffic analysis system 210 cleanses the raw traffic data by removing information from the traffic data that may identify a particular user on the Internet 100 and then stores the anonymous data in the database 200. The traffic analysis system 210 estimates the global traffic to every significant Web site on the Internet 100. The present invention uses this data not only for computing the number of advertising impressions given an estimate of the frequency of rotation on that page, but also in the probe mapping system 320. In one embodiment, the traffic analysis system 210 receives traffic data from a cache site on the Internet 100. The goal is to accurately measure the number of page views by individual users, and therefore the number of advertising impressions.

The advertisement sampling system 220 uses the anonymous traffic data to determine which URLs to include in the sample retrieved from the Web server 112. The advertisement sampling system 220 contacts the Web server 112 through the Internet 100 to retrieve a URL 114, 116, 118 and extract the advertisements therein along with the accompanying characteristics that describe the advertisements.

The advertisement sampling system 220 stores these advertisement characteristics in the database 200. The advertisement sampling system 220, for example, Online Media Network Intelligent Agent Collection ("OMNIAC"), or the Cloudprober, repeatedly probes prominent Web sites, extracts advertisements from each Web page returned by the probe, and classifies the advertisements in each Web page by type, technology and advertiser.

The traffic analysis system 210 and the advertisement sampling system 220 also present the data retrieved from the Internet 100 to the statistical summarization system 230 for periodic processing. The statistical summarization system 230 calculates the advertising frequency, impressions, and spending on a per site and per week basis.

The graphical user interface for the present invention includes the user interface 240 and Web front end 250. The account manager 260, operator 262, and media editor 264 access the user interface 240 to administer access by the client 140 to the Web front end 250 (e.g., account and password management), define sites and probe instructions, and manage the advertising taxonomy, content classification, and rate card collection for the advertising prevalence system 130. The Web front end 250 is the Web browser interface that a client 140 uses to retrieve the advertisement measurement results from the database 200 as generated by the traffic analysis system 210, advertisement sampling system 220, and the statistical summarization system 230.

Figure 3:
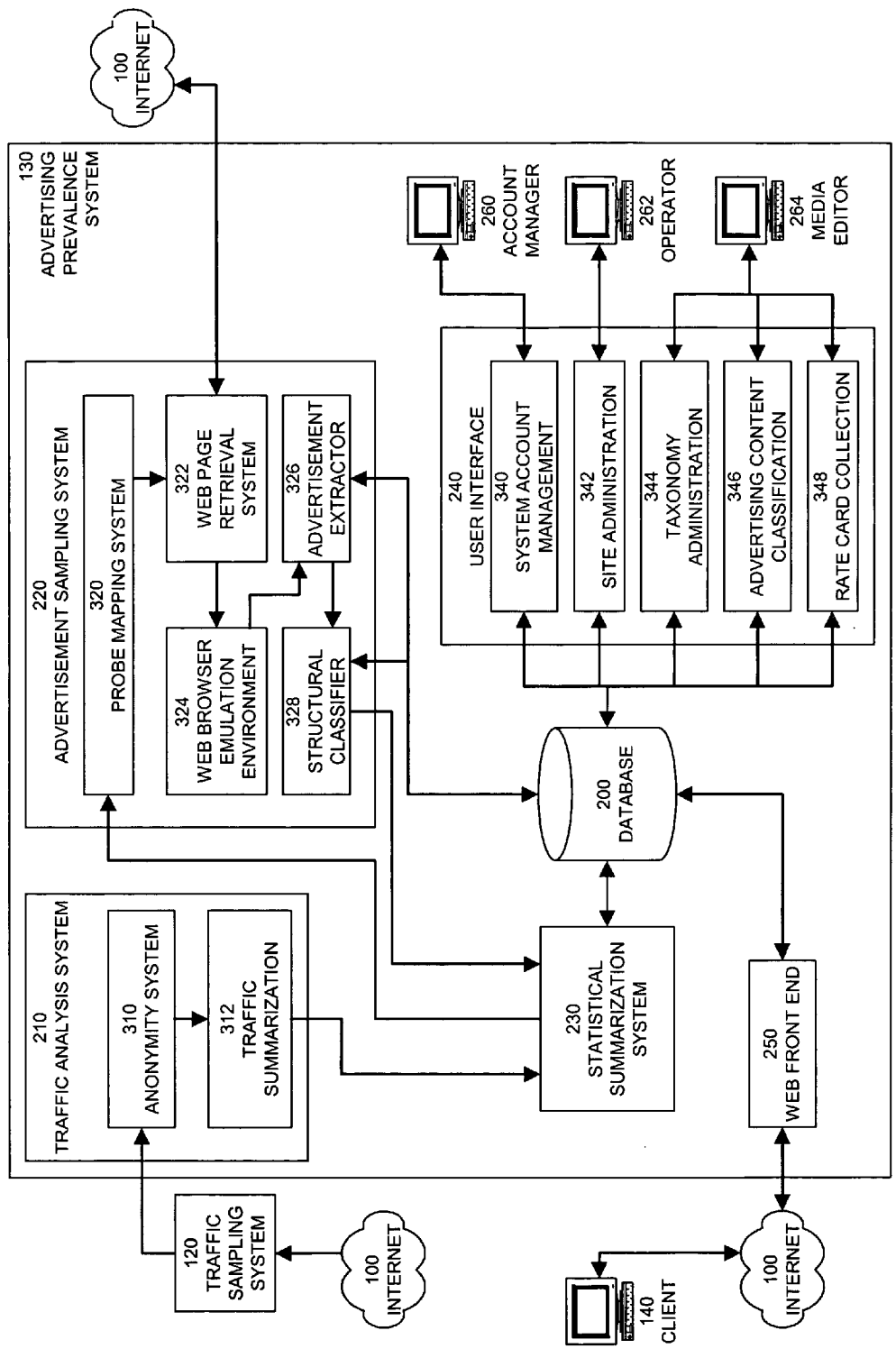
FIG. 3 depicts the network diagram of FIG. 2, in greater detail, to show the elements and sub-elements that comprise the advertising prevalence system and the connections to the network environment.

FIG. 3 further expands the detail of the advertising prevalence system 130 to depict the logical components comprising the elements of the advertising prevalence system 130 shown in FIG. 2. FIG. 3 also depicts the relationships between the network environment and those logical components.

The traffic analysis system 210 includes an anonymity system 310 and traffic summarization 312 process.

The anonymity system 310 cleanses the data received from the traffic sampling system 120 by removing information that identifies a particular user on the Internet. The data is rendered anonymous by passing all user information (e.g., originating internet protocol ("IP") number or cookies) through a cryptographically secure one-way hash function; this assures the utmost privacy for Web users without devaluing the resulting data. The anonymity system 310 presents the cleansed data to the traffic summarization system 312 which in turn stores the aggregated URL count information in database 200.

The traffic summarization process 312 receives cleansed data from the anonymity system 310. The anonymous traffic data is summarized to yield traffic totals by week or month for individual URLs, domains, and Web sites. The traffic summarization process 312 scales the data by weighting factors to extrapolate total global traffic from the sample.

The advertisement sampling system 220 in FIG. 3 includes a probe mapping system 320, Web page retrieval system 322, Web browser emulation environment 324, advertisement extractor 326, and a structural classifier 328.

The probe mapping system 320 generates a probe map, i.e., the URLs 114, 116, 118 that the advertisement sampling system 220 will visit. This probe map assists the advertisement sampling system 220 with the measurement of the rotation of advertisements on individual Web sites. The preferred embodiment of the present invention continuously fetches various Web pages in the probe map. In an alternative embodiment, the present invention visits each URL in the probe map approximately every 6 minutes. Another embodiment can vary the fetching rate by considering several factors including the amount of traffic that visits the Web site as a whole and the individual Web page in question, the number of advertisements historically seen on the Web page, and the similarity of the historically observed ad rotation to other sampled pages.

The Web page retrieval system 322 uses the probe map generated by the probe mapping system 320 to determine which Web pages it needs to sample and the frequency of the sampling. For each URL in the probe map generated by the probe mapping system 320, the Web page retrieval system 322 fetches a Web page, extracts each advertisement from the Web page, and stores the advertisement's attributes in the database 200. The data retrieved from each URL in the probe map is used to calculate the frequency with which each advertisement is shown on a particular Web site.

For each Web page, the Web browser emulation environment 324 simulates the display of the Web page in a browser. This simulation guarantees that the present invention will detect not only static advertisements, but also dynamic advertisements generated by software programs written in a language such as JavaScript, Perl, Java, C, C++, or HTML that can be embedded in a Web page.

The advertisement extractor 326 extracts the online advertisements from the result of the simulation performed by the Web browser emulation environment 324. The advertisement extractor 326 identifies features of the advertising content (i.e., "fragments") extracted from the Web pages returned by the probe mapping system 320 that are of particular interest. Advertisements are the most interesting dynamic feature to extract, however, an alternative embodiment of the present invention may use the extraction technology to collect any type of digital content including promotions, surveys, and news stories. The advertisement extractor 326 can use various advertisement extraction methods, including rule-based extraction, heuristic extraction, and comparison extraction.

Rule-based extraction relies upon a media editor 264 to use the user interface 240 to create rules. The user interface 240 stores the rules in the database 200 and the advertisement extractor 326 applies the rules to each Web page that the Web page retrieval system 322 retrieves. The effect of running a rule is to identify and extract an HTML fragment from the Web page (i.e., the part of the page containing the advertisement). The advertisement extractor 326 first converts the HTML representation of the fetched Web page into a well-formed XML representation. Following this conversion, the rules are applied to the parse tree of the XML representation of the Web page.

Heuristic extraction relies upon the similarity of advertisements at the HTML or XML source code level because the advertisements are typically inserted by an advertisement server when the Web page is generated in response to the Web browser emulation environment 324 request to display the Web page. Heuristic extraction analyzes the source code for clues (e.g., references to the names of known advertisement servers) and extracts fragments that surround those clues. The advantage of this method is that the extraction is automatic and the media editor need not create the rules.

Comparison extraction repeatedly fetches the same Web page. This extraction method compares the different versions of the Web page to determine whether the content varies from version to version. The portion of the Web page that varies with some degree of frequency is usually an advertisement and is extracted.

The structural classifier 328 parses each advertisement and stores the structural components in the database 200 and passes those components to the statistical summarization system 230. Each advertisement fragment extracted by the advertisement extractor 326 is analyzed by the structural classifier 328. The process performed by the structural classifier 328 comprises duplicate fragment elimination, structural fragment analysis, duplicate advertisement detection. The structural classifier 328 performs duplicate fragment elimination by comparing the current advertisement fragment to other fragments in the database 200. Two advertisement fragments are duplicates if the fragments are identical (e.g., each fragment has the exact same HTML content). If the structural classifier 328 determines that the current fragment is a duplicate of a fragment in the database, the advertisement sampling system 220 logs another observation of the fragment and continues processing fragments.

The structural classifier 328 performs structural fragment analysis on the XML representation of the Web page by determining the "physical type" of the fragment (i.e., the HTML source code used to construct the advertisement). Physical types that the present invention recognizes include banner, form, single link, and embedded content. Banner advertisement fragments include a single HTML link having one or two enclosed images and no FORM or IFRAME tag. Form advertisement fragments include a single HTML form having no IFRAME tag. Single link advertisement fragments include a link with textual, but no IMG, FORM, or IFRAME tags. Embedded content advertisement fragments reference an external entity using an IFRAME tag. After performing this analysis, the structural classifier 328 updates the advertisement fragment in the database. For a banner advertisement fragment, the structural classifier 328 stores the link and image URL's in the database 200. A form advertisement fragment requires the creation of a URL by simulating a user submission that sets each HTML control to its default value. The structural classifier 328 stores this URL and the "form signature" (i.e., a string that uniquely describes the content of all controls in the form) in the database 200. For a single text advertisement fragment, the structural classifier 328 stores the URL for the link and all text contained within the link in the database 200. For embedded content advertisement fragments, the structural classifier 328 stores the URL associated with the external reference in the database 200. This URL is loaded by the system, and the referenced document is loaded. Once the loaded document has been structurally analyzed, the original fragment inherits any attributes that result from analysis of the new fragment.

The structural classifier 328 performs duplicate advertisement detection on each advertisement fragment that has a known physical type because these fragments represent advertisements. Each unique advertisement has information, including which site definitions are associated with the fragment, stored in the database 200. The structural classifier 328 determination of uniqueness depends on different criteria for each type of fragment. The first step for every type of definition is to resolve all URLs associated with the record. URLs that refer to images are loaded, and duplicate images are noted. HTML link URLs, also known as "click URLs", are followed each time a new ad is created. The final destination for a click URL, after following all HTTP redirects, is noted. This is also done for simulated link submission URLs associated with form definitions. Once all URLs have been resolved, the structural classifier 328 determines whether the advertisement is unique. Banner advertisement fragments are considered unique if they have the same number of images, if the images are identical, and if the destination URL is identical. Form advertisement fragments are considered unique if they have the same signature, and the same destination URL. Single link advertisement fragments are considered unique if they have the same textual content and the same destination URL.

The statistical summarization system 230 calculates the advertisement statistics for each unique advertisement in the database 200. The present invention calculates, for each Web site, the advertising impressions (i.e., the number of times a human being views an advertisement). The present invention calculates the advertising impressions, I, using the formula $I = T \times R$, where T is the traffic going to the site, and R is the rotation of advertisements on that site. The present invention also calculates the spending, S, using the formula $S = I \times RC$, where I is the advertising impressions for a Web site, and RC is the rate code for the Web site. Most advertising buys are complicated deals with volume purchasing discounts so our numbers do not necessarily represent the actual cost of the total buy.

The Web front end 250 is a graphical user interface that provides a client 140 with a query interface to the database 200 populated by the traffic analysis system 210, advertisement sampling system 220, and the statistical summarization system 230. The client 140 can use the Web front end 250 to create, store, edit and download graphical and tabular reports for one or more industry categories depending on the level of service the client 140 selects.

The user interface 240 in FIG. 3 includes a separate component for system account management 340, site administration 342, taxonomy administration 344, advertising content classification 346, and rate card collection 348.

The account manager 260 uses the system account management 340 module of the user interface 240 to simplify the administration of the Web front end 250. The account manager 260 uses the system account management 340 module to create and delete user accounts, manage user account passwords, and check on the overall health of the Web front end 250.

The operator 262 uses the site administration 342 module of the user interface 240 to simplify the administration of the site definitions. Analysts from the Internet Advertising Bureau estimate that over 90% of all Web advertising dollars are spent on the top fifty Web sites. Site selection begins by choosing the top 100 advertisements by considering data from Media Metrix, Neilsen/Net Ratings, and the proxy traffic data in the database 200. These lists are periodically updated to demote Web sites with low traffic levels and promote new sites with high traffic levels. The present invention also includes Web sites that provide significant content in key industries. A site chosen for inclusion in the site definitions must have the structure of the site analyzed to remove sections that do not serve advertisements, originate from foreign countries, or are part of a frame set. Sites that originate from a foreign country, such as yahoo.co.jp, sell advertising in the host country, and therefore are not applicable to the measurements calculated by the present invention. Web sites that use an HTML frameset are treated very carefully to only apply rotation rates to the traffic from the sections of the frameset that contain the advertisement. These combined exclusions are key to making accurate estimates of advertising impressions. The present invention also tags sections that cannot be measured directly, due to registration requirements (e.g., mail pages). Since Web sites change frequency, this structural analysis is repeated periodically. Eventually the analysis stage will automatically flag altered sites to allow even more timely updates.

The media editor 264 uses the taxonomy administration 344, advertising content classification 346, and rate card collection 348 modules of the user interface 240. The taxonomy administration 344 module simplifies the creation and maintenance of the attributes assigned to advertisements during content classification including the advertisement's industry, company, and products. The taxonomy names each attribute and specifies its type, ancestry and segment membership. For example, a company Honda, might be parented by the Automotive industry and belong to the industry segment Automotive Manufactures. The advertising content classification 346 component assists the media editor 264 with performing the content classification.

The structural classifier 328 performs automated advertisable assignment to determine what the advertisement is advertising. This process includes assigning "advertisables" (i.e., attributes describing each "thing" that the advertisement is advertising) to each advertisement fragment. In another embodiment of the present invention, the advertisement sampling system 220 uses an extensible set of heuristics to assign advertisables to each advertisement. In the preferred embodiment, however, the only automatic method employed is location classification. Location classification relies on the destination URL in order to assign a set of advertisables to an advertisement. A media editor 264 uses the user interface 240 to maintain the set of classified locations. For example, the first time a media editor observes an advertisement in which the click-thru URL is www.honda.com, he can enter this URL as pertaining to the advertiser "Honda Motors". Any subsequent advertisement that includes the same click-thru URL will also be recognized as a Honda advertisement. A classified location comprises a host, URL path prefix, and set of advertisables. Location classification assigns a classified location advertisable to an advertisement if the host in the destination URL matches the host of the classified location and the path prefix in the classified location matches the beginning of the path in the destination URL.

The structural classifier 328 performs human advertisable assignment and verification as a quality check of the advertisable data. This phase is the most human intensive. A media editor 264 uses a graphical user interface module in the user interface 240 to display each advertisement, verify automatic advertisable assignments, and assign any other advertisables that appear appropriate after inspection of the advertisement and the destination of the advertisement. The location classification database is also typically maintained at this time.

The media editor 264 uses the rate card collection 348 module to enter the contact and rate card information for a Web site identified by the traffic analysis system 210, as well as, designated advertisers. Rate card entry includes the applicable quarter (e.g., Q4 2000), advertisement dimensions in pixels, fee structure (e.g., CPM, flat fee, or per click), cost schedule for buys of various quantities and duration. The media editor 264 also records the URL address of the online media kit and whether rates are published therein. Contact information for a Web site or advertiser includes the homepage, name, phone and facsimile numbers, email address, and street address.

Figure 4A:
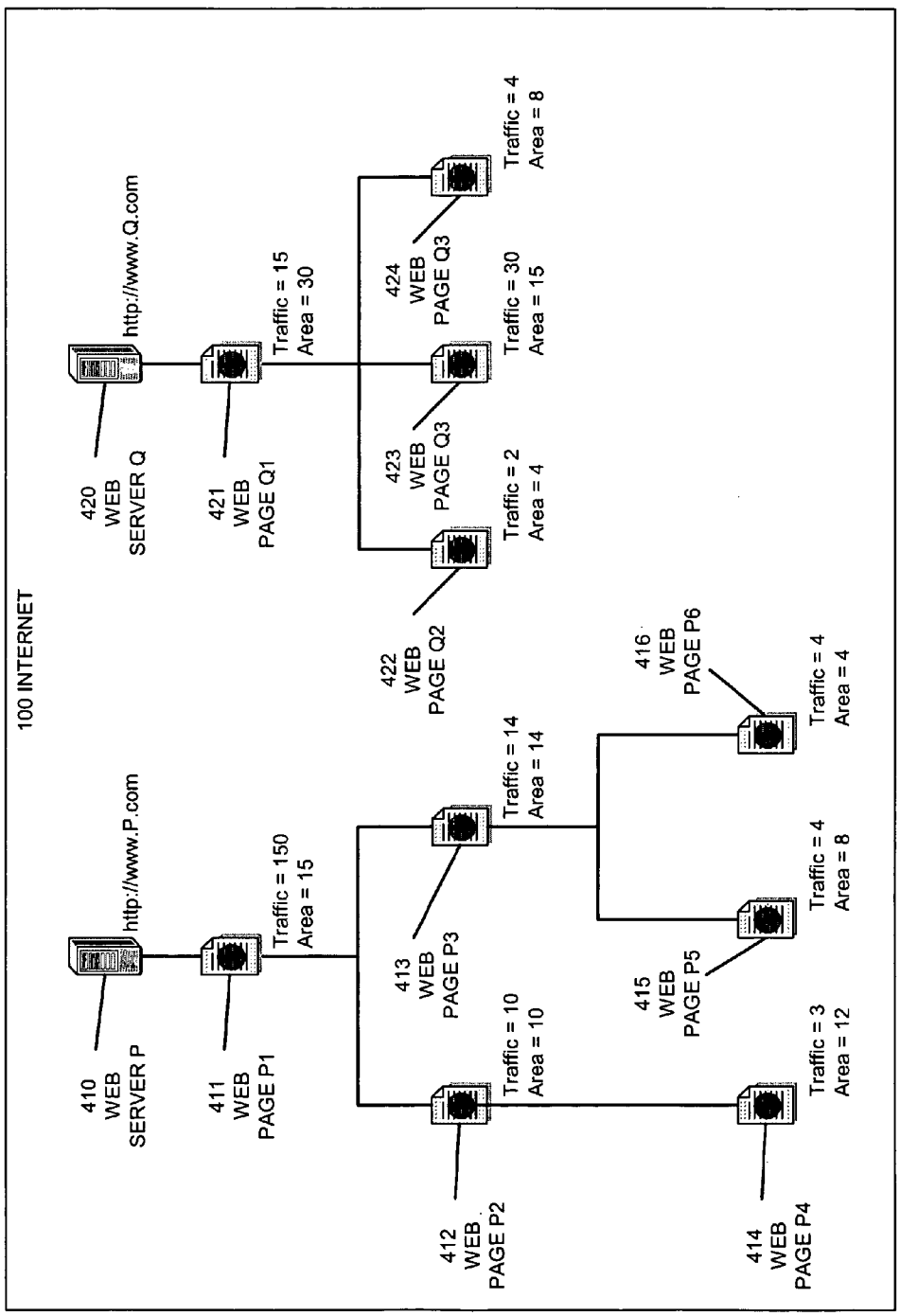
FIG. 4A is an exemplary Web site that illustrates the expected values used in the calculation of the advertising prevalence statistics.
Figure 4B:
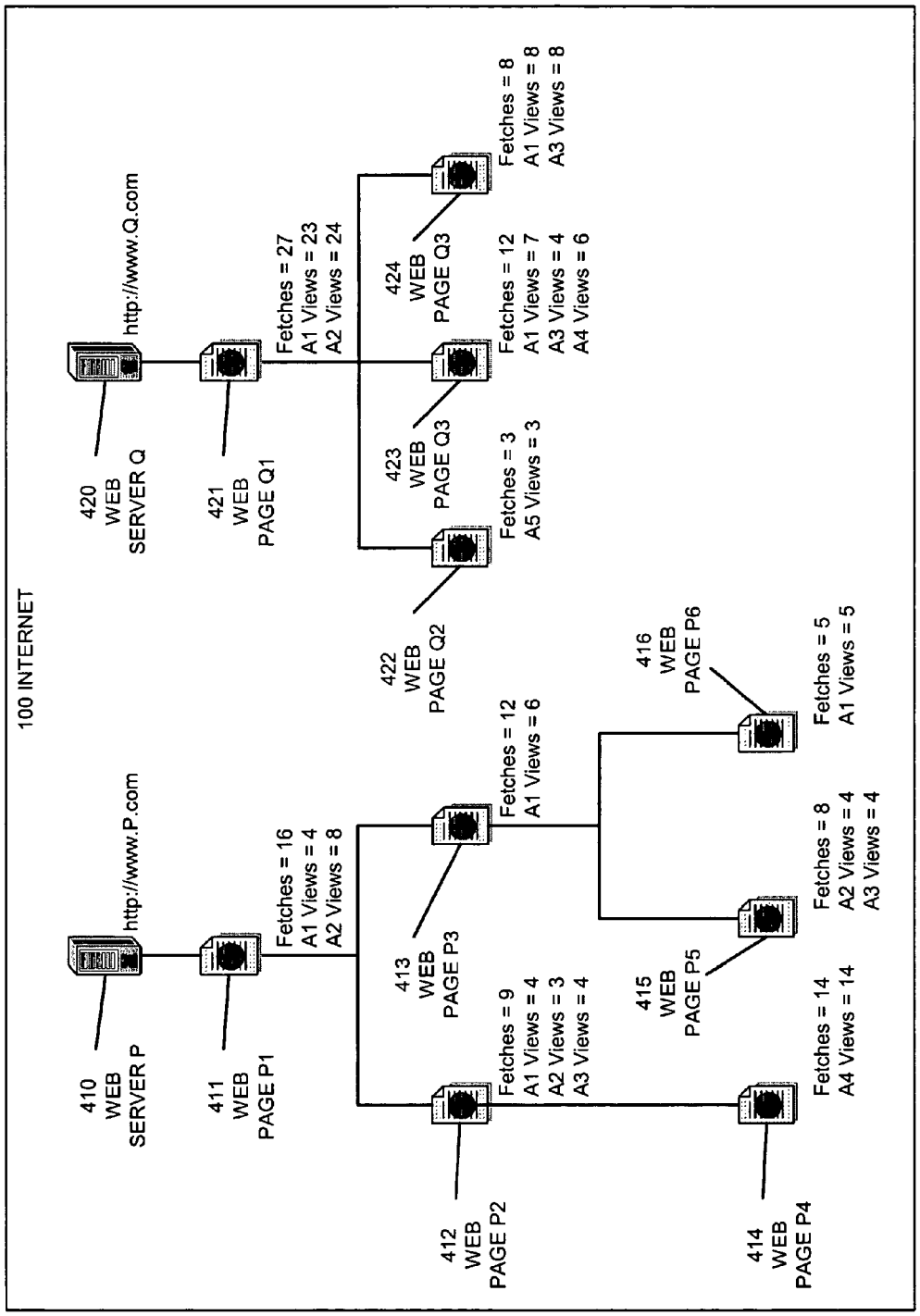
FIG. 4B is an exemplary Web site that illustrates the observed values used in the calculation of the advertising prevalence statistics.
Figure 4C:
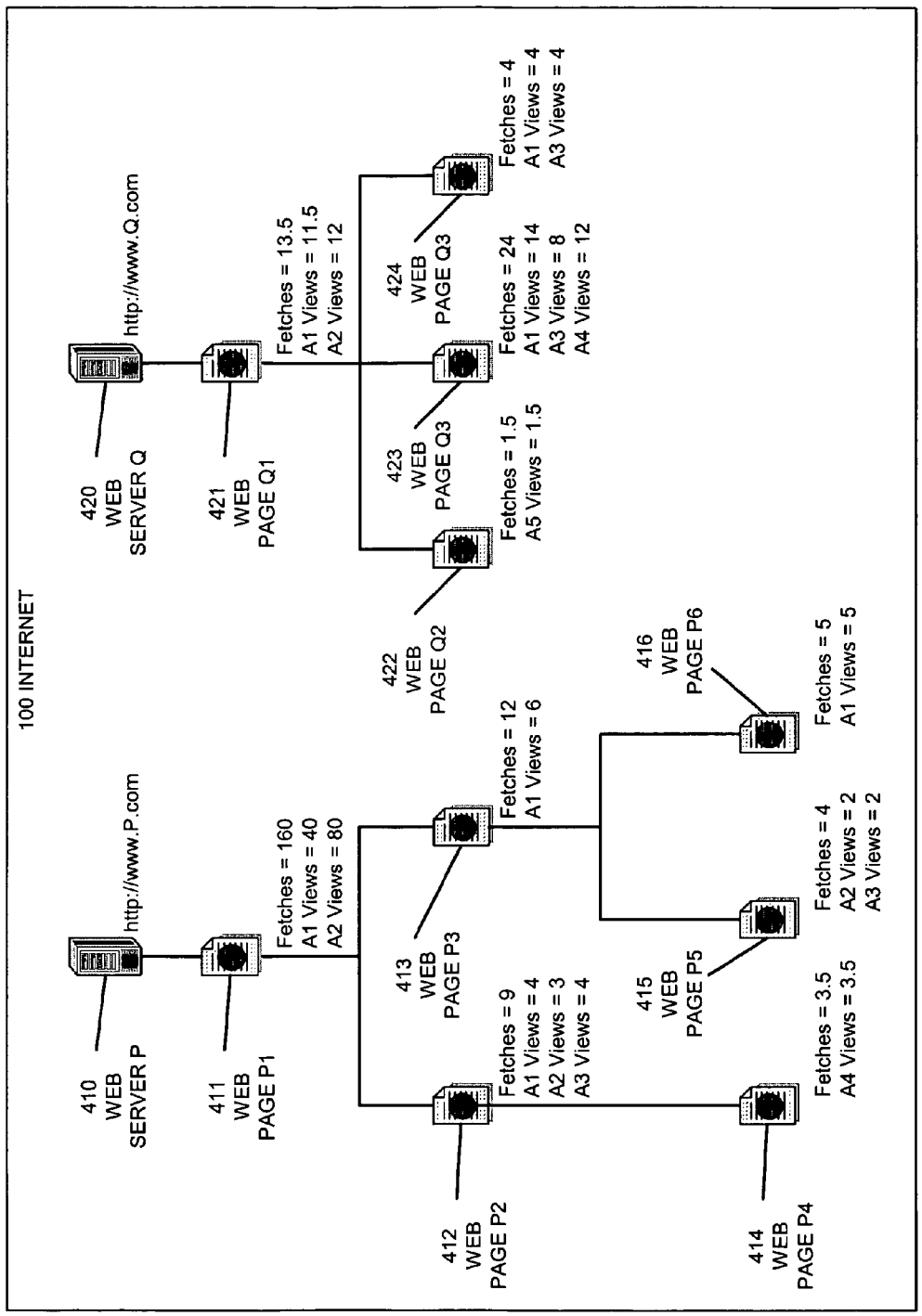
FIG. 4C is an exemplary Web site that illustrates the weighted values used in the calculation of the advertising prevalence statistics.

FIGS. 4A through 4C illustrate the preferred method for calculating the advertising prevalence statistics. The calculation of the advertising prevalence statistics is an iterative process that uses expected values derived by the traffic analysis system 210 and observed values derived by the advertising prevalence system 220 to calculate the weighted values and the advertising prevalence statistics. FIGS. 4A through 4C each depict a network on the Internet 100 that includes two Web sites served by Web server P 410 and Web server Q 420. FIG. 4A illustrates exemplary expected traffic values for the network. FIG. 4B illustrates exemplary observed traffic values for the network. FIG. 4C illustrates exemplary weighted traffic values for the network.

The first step in the process is to normalize the results from the traffic analysis system 210. The traffic analysis system 210 provides the traffic received by each Web page in the traffic data sample. FIG. 4A depicts the exemplary traffic received at each Web page 411-416, 421-424 in the Internet 100 with the label "Traffic=." The probe map generated by the probe mapping system 320 includes an entry for each Web page 411-416, 421-424. The probe map also includes an "area" that each Web page 411-416, 421-424 consumes in the probe map. FIG. 4A depicts the exemplary area that each Web page 411-416, 421-424 consumes in the probe map with the label "Area=". The normalized results are calculated by dividing the area that a Web page consumes in the probe map by the sum of the area for each Web page in the traffic sample. In FIG. 4A, the normalized value, or chance, for Web page P1 411 is the area for Web page P1 (i.e., 15) divided by the sum of the area for Web page P1, P2, P3, P4, P5, P6, Q1, Q2, Q3, and Q4 (i.e., 120). The normalized value is, therefore, 0.125, or 12.5%. In addition to the normalized value, the system also determines the scale by dividing the traffic for a Web page by the area for the Web page. In FIG. 4A, the scale for Web page P1 411 is the traffic for Web page P1 (i.e., 150) divided by the area for Web page P1 (i.e., 15), therefore, the scale for Web page P1 is 10. Table 1 summarizes the scale and chance values for the remaining Web page in FIG. 4A.

TABLE 1

| Web Page | Area | Scale | Chance |
|---|---|---|---|
| P1 | 15 | 10 | 12.5% |
| P2 | 10 | 1 | 8.3% |
| P3 | 14 | 1 | 12% |
| P4 | 12 | 0.25 | 10% |
| P5 | 8 | 0.5 | 6.7% |
| P6 | 4 | 1 | 3.3% |
| Q1 | 30 | 0.5 | 25% |
| Q2 | 4 | 0.5 | 3.3% |
| Q3 | 15 | 2 | 12.5% |
| Q4 | 8 | 0.5 | 6.7% |

FIG. 4B depicts the exemplary Web page fetches at each Web page 411-416, 421-424 in the Internet 100 with the label "Fetches=". FIG. 4B also depicts the exemplary number of views of each advertisement on a Web page 411-416, 421-424 with a label such as "A1 Views=" to indicate the number of views of advertisement A1, "A2 Views=" to indicate the number of views of advertisement A2, etc.

FIG. 4C depicts the exemplary Web page weighted fetches at each Web page 411-416, 421-424 in the Internet 100 with the label "Fetches=". FIG. 4C also depicts the exemplary number of views of each advertisement on a Web page 411-416, 421-424 with a label such as "A1 Views=" to indicate the number of views of advertisement A1, "A2 Views=" to indicate the number of views of advertisement A2, etc. The next step in the calculation process is to calculate the Scaled Fetches for each Web site 410, 420 by summing the product of the observed fetches from FIG. 4B and the scale from FIG. 4A, for each Web page 411-416, 421-424 in the Web site. Next, the calculation computes the Traffic for each Web site 410, 420 by summing the traffic from FIG. 4A for each Web page 411-416, 421-424 in the Web site. The rate card, or CPM, is a value assigned by the media editor 264 for each Web site 410, 420. Table 2 summarizes the Scaled Fetches, Traffic, and CPM for FIGS. 4A through 4C.

TABLE 2

| Site | Scaled Fetches | Traffic | CPM |
|---|---|---|---|
| P | 193.5 | 185 | $35.00 |
| Q | 43 | 51 | $50.00 |

The next step in the calculation process is to compute the Scaled Observations for each advertisement on each Web site 410, 420 by summing the product of the advertisement views from FIG. 4B and the scale from FIG. 4A, for each Web page 411-416, 421-424 in the Web site 410, 420. The final step in the calculation is to compute the advertising prevalence statistics (i.e., Frequency, Impressions, and Spending) for each advertisement in each Web site 410, 420. Frequency is computed by dividing the scaled observations by the scaled fetches for each advertisement in each Web site 410, 420. Impressions is computed by multiplying the Frequency by the Traffic from Table 2 above for each advertisement in each Web site 410, 420. Spending is computed by multiplying the Impressions by the CPM from Table 2 above for each advertisement in each Web site 410, 420. Table 3 summarizes the Scaled Observations, Frequency, Impressions, and Spending for Web site P 410 using the data in FIGS. 4A through 4C. Table 4 summarizes the Scaled Observations, Frequency, Impressions, and Spending for Web site Q 420 using the data in FIGS. 4A through 4C.

TABLE 3

| | Scaled Observations | Frequency | Impression | Spending |
|---|---|---|---|---|
| A1 | 55.0 | 0.28 | 52.58 | $1.84 |
| A2 | 85.0 | 0.44 | 81.27 | $2.84 |
| A3 | 6.0 | 0.03 | 5.74 | $0.20 |
| A4 | 3.5 | 0.02 | 3.35 | $0.12 |
| A5 | | | | |

TABLE 4

| | Scaled Observations | Frequency | Impressions | Spending |
|---|---|---|---|---|
| A1 | 29.5 | 0.69 | 34.99 | 1.75 |
| A2 | 12.0 | 0.28 | 14.23 | 0.71 |
| A3 | 12.0 | 0.28 | 14.23 | 0.71 |
| A4 | 12.0 | 0.28 | 14.23 | 0.71 |
| A5 | 1.5 | 0.03 | 1.78 | 0.09 |

Figure 4D:
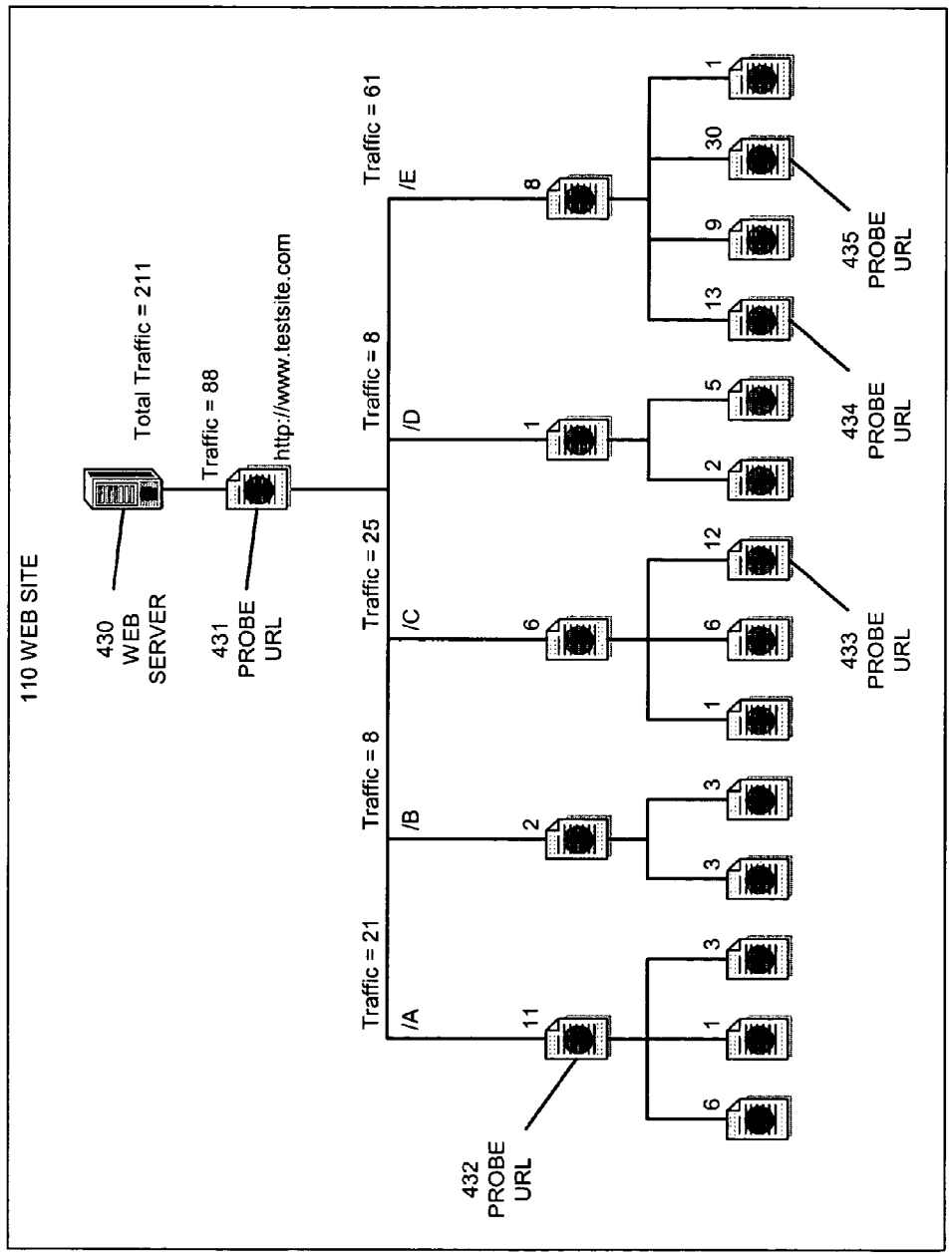
FIG. 4D is an exemplary Web site that illustrates an alternative method for the calculation of the advertising prevalence statistics.

FIG. 4D illustrates an alternative embodiment for calculating the advertising prevalence statistics. In this embodiment, the prober is tuned to optimize rotation measurement accuracy. Statistical estimates of accuracy in the field are difficult to perform, due to the non-stationary nature of advertising servers. When probing every 6 minutes, it has a 0.06% resolution in rotational frequency over a one-week measurement period.

Also in the alternative embodiment of FIG. 4D, the probes are distributed among the sites to accurately measure ad rotation on each site. The number of probing URLs assigned to a site is determined from three variables. The first is a constant across all sites; a certain number of probing URLs are required to accurately measure rotation on even the smallest site. Half of the probes are assigned with this variable. The second variable, weighted at 40%, is the amount of traffic going to a site, as each probing URL represents a proportion of total Internet traffic. The twenty largest sites receive over 75% of these probes. Finally the complexity of site, as measured by the total number of unique URLs found in our proxy traffic data, is taken into account, with more complicated sites receiving extra probing URLs. This accounts for the remaining 10% of the probe distribution. Probing URLs can be chosen using a Site Shredder algorithm to break the site into regions (i.e., sets of pages whose advertisement rotation characteristics are likely to be similar) for probing. The distribution of regions is mathematically designed to maximize site coverage and, therefore, advertisement rotation accuracy. A single URL is chosen to represent the advertising rotation from each region. This URL is chosen as the most heavily trafficked page containing advertisements in that region. The algorithm avoids date specific pages or pages referring to a time-limited event such as the August 1999 total lunar eclipse.

The alternative embodiment of FIG. 4D calculates advertisement impressions by combining the estimates of rotation and traffic for each Web site 430. To do this the system breaks the site down into its constituent stems using the Site Shredder algorithm. The rotation of advertisements in each advertisement slot is calculated and applied to estimate advertising impressions on its associated stem. The advertisement rotation on stems without probes is estimated from an average, weighted by traffic, of advertisement rotation of probes on a similar level.

For instance, in FIG. 4D, the sample site tree has five probes URLs 431-435, $P_{1-5}$, placed on five main branches off a main page and 14 secondary branches. The number on each page is the sample traffic going to that page. Probe $P_1$ on the home page, "www.testsite.com", measures the rotation, R, to be applied to the traffic going to that main page, with traffic of 88 page views. Branch A has a single probe, $P_2$, placed on the top-level page of that branch with a probing URL "www.testsite.com/A/". The rotation of this single probing URL is estimated as $R_A$ and is applied to the traffic for that entire stem, a total of 21 page views. Branch C has a probe, $P_3$, on a heavily trafficked secondary branch page, with a probing URL "www.testsite.com/C/third.html". The rotation, Rc, of this page is applied to all the secondary branch pages on that stem and also up one level in the tree, across a total of 25 page views. Branch E receives a large portion of the traffic for the site, a total of 61 page views, and therefore is assigned two probes, $P_4$ and $P_5$. These are on two secondary branch pages, "www.testsite.com/E/first.html" and "www.testsite.com/E/third.html". The rotation of each is applied the traffic to those individual pages. For the remaining 18 page views on that branch (ten page views from two secondary pages and eight from the top level page of that branch) a weighted rotation is calculated, $R_E$ (($13 \times R_{E1}$)+ ($30 \times R_{E3}$))/(13+30). The analysis of stem rotation results in advertising impressions for over 96% of the site. The impressions for the final two branches, B and D, are calculated with an average rotation from adjacent branches, weighted by traffic, $$R_B = R_D = ((21 \times R_A) + (25 \times Rc) + (61 \times R_E)) \div (21 + 25 + 61).$$

This analysis results in total impressions across the site for each unique advertisement. The final calculation performed by the alternative embodiment of FIG. 4D is spending, the product of the Impressions and the Rate Card.

Figure 5:
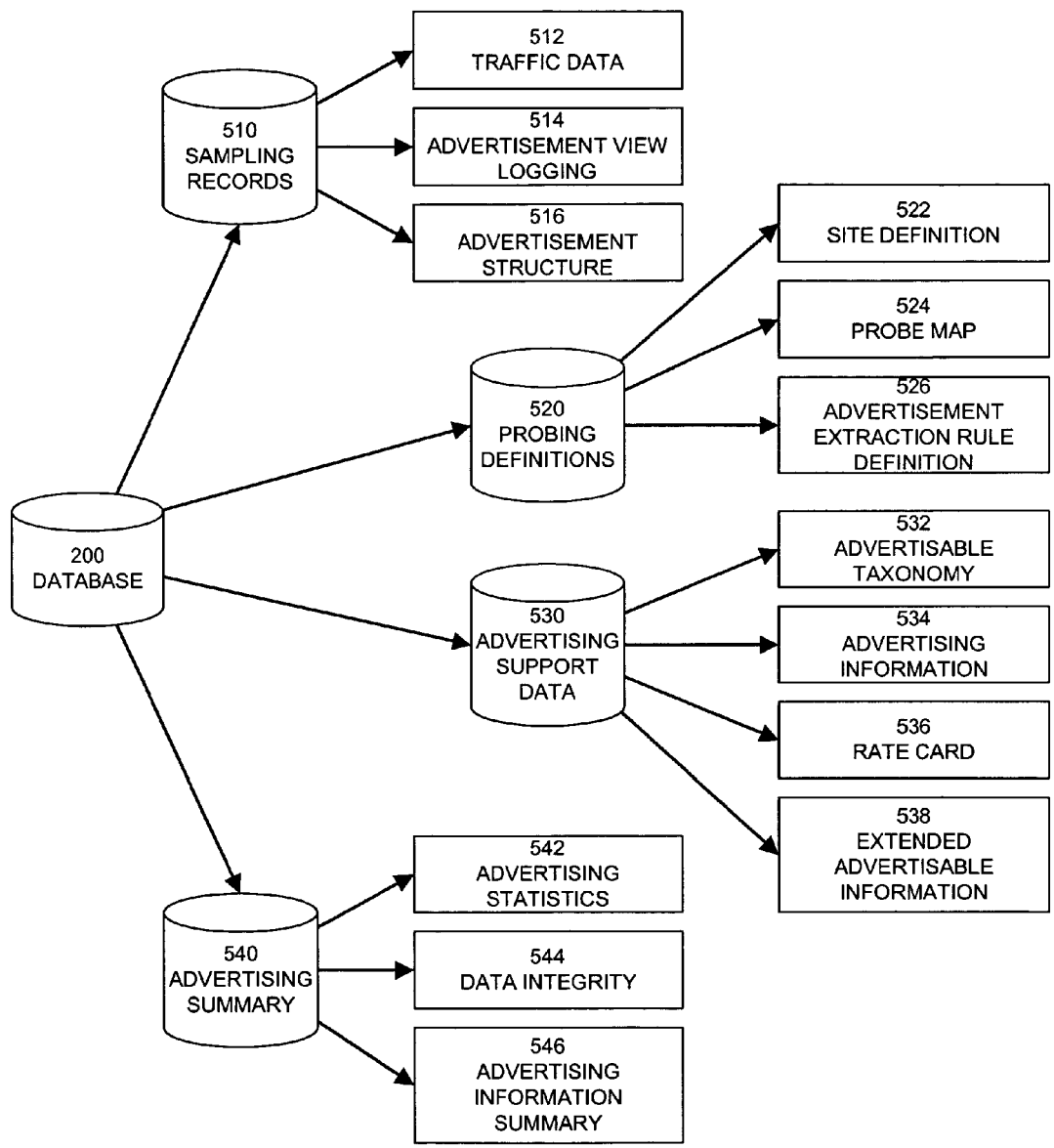
FIG. 5 illustrates an example of a database structure that the advertising prevalence system may use.

FIG. 5 illustrates a database structure that the advertising prevalence system 130 may use to store information retrieved by the traffic sampling system 120 and the Web page retrieval system 322. The preferred embodiment segments the database 200 into partitions. Each partition can perform functions similar to an independent database such as the database 200. In addition, a partitioned database simplifies the administration of the data in the partition. Even though the preferred embodiment uses database partitions, the present invention contemplates consolidation of these partitions into a single database, as well as making each partition an independent database and distributing each database to a separate general purpose computer workstation or server. The partitions for the database 200 of the present invention include sampling records 510, probing definitions 520, advertising support data 530, and advertising summary 540. The preferred embodiment of the present invention uses a relational database management system, such as the Oracle8i product by Oracle Corporation, to create and manage the database and partitions. Even though the preferred embodiment uses a relational database, the present invention contemplates the use of other database architectures such as an object-oriented database management system.

The sampling records 510 partition of database 200 comprises database tables that are logically segmented into traffic data 512, advertisement view logging 514, and advertising structure 516 areas.

The traffic data 512 area contains data processed by the traffic sampling system 120, anonymity system 310, and statistical summarization system 230. The data stored in this schema includes a "munged" URL, and the count of traffic each URL receives per traffic source over a period of time. A "munged" URL is an ordinary URL with the protocol field removed and the order of the dotted components in the hostname reversed. For example, the present invention transforms an ordinary URL, such as http://www.somesite.com/food, into a munged URL by removing the protocol field (i.e., "http://") and reversing the order of the dotted components in the hostname (i.e., "www.somesite.com"). The resulting munged URL in this example is "com.somesite.www/food". The present invention uses this proprietary URL format to greatly enhance the traffic data analysis process. The traffic sampling system 120 populates the traffic data 512 area in database 200. The probe mapping system 320 accesses the data in the traffic data 512 area to assist the Web page retrieval system 322 and the statistical summarization system 230 with the calculation of the advertising impression and spending statistics.

The advertisement view logging 514 area logs the time, URL, and advertisement identifier for each advertisement encountered on the Internet 100. This area also logs each time the system does not detect an advertisement in a Web page that previously included the advertisement. In addition, the system logs each time the system detects a potential advertisement, but fails to recognize the advertisement during structural classification. The structural classifier 328 and the Web page retrieval system 322 of the advertisement sampling system 220 populate the advertisement view logging 514 area in database 200. The statistical summarization system 230 accesses the data in the advertisement view logging 514 area to determine the frequency that each advertisement appears on each site.

The advertisement structure 516 area contains data that characterizes each unique advertisement located by the system. This data includes the content of the advertisement, advertisement type (e.g., image, HTML form, Flash, etc.), the destination URL linked to the advertisement, and several items used during content classification and diagnostics, including where the advertisement was first seen, and which advertisement definition originally produced the advertisement. The structural classifier 328 component of the advertisement sampling system 220 populates the advertisement structure 516 area in database 200. The user interface 240 accesses the data in the advertisement structure 516 area to display each advertisement to the media editor 264 during classification editing. The Web front end 250 also accesses the data in the advertisement structure 516 area to display the advertisements to the client 140.

The probing definitions 520 partition of database 200 comprises database tables that are logically segmented into site definition 522, probe map 524, and advertisement extraction rule definition 526 areas.

The site definition 522 area carves the portion of the Internet 100 that the system probes into regions. The primary region definition is a "site", a cohesive entity the system needs to analyze, sample, and summarize. The system defines each site in terms of both inclusive and exclusive munged URL prefixes. A "munged URL prefix" is a munged URL that represents the region of all munged URLs for which it is a prefix. An "inclusive munged URL prefix" specifies that a URL is part of some entity. An "exclusive munged URL prefix" specifies that a URL is not part of some entity, overriding portions of the entity included by an inclusive prefix. To illustrate, the following is list of munged URLs that may result from the processing of a set of URLs in a traffic sample.
1. com.somesite/
2. com.somesite/foo
3. com.somesite/foo/bar
4. com.somesite/foo/blah
5. com.someothersite/

If the site definition for "somesite" includes the inclusive URL prefix "com.somesite/" and the exclusive URL prefix "com.somesite/foo/bar", the application of this site definition to the above sample URLs listed above yields a system that includes URL 1, 2, and 4. URL 3 is not part of the site definition due to the explicit exclusion of "com.somesite/foo/bar". URL 5 is not part of the site definition because it was never included in the inclusive URL prefix "com.somesite/". The user interface 240 populates the site definition 522 area in database 200. The probe mapping system 320 accesses the data in the site definition 522 area to determine which URLs to probe. The statistical summarization system 230 accesses the data in the site definition 522 area to determine traffic levels to sites by summing traffic to URLs included in a site.

The probe map 524 area contains a weight for each URL in each site that the system is measuring. This weight determines the likelihood that the system will choose a URL for each probe. The system generates the weights by running complex iterative algorithms against the traffic data and the probing records in the database 200. An analysis of the traffic data can discern which URLs have been visited, how often users have visited those URLs. The result of the analysis guarantees that the system performs advertisement sampling of these URLs in similar proportions, given certain constraints such as a maximum number of probes to allocate to any single URL. The data in the sampling records 510 partition of the database 200 is useful for determining which URLs are in need of special handling due to past behavior (e.g., a URL is sampled less infrequently if the system has never detected an advertisement in the URL). The probe mapping system 320 populates the probe map 524 areas in the database 200. The probe mapping system 320 accesses the data in the probe map 524 area to allocate the probes. The statistical summarization system 230 accesses the data in the probe map 524 area to determine which URLs should have their rotations scaled to counter the effect of probe map constraint enforcement.

The advertisement extraction rule definition 526 area describes Extensible Markup Language ("XML") tags, typically representing a normalized HTML document, that indicate those portions of the content that the system considers to be advertisements. The system defines an extraction rule in terms of "XML structure" and "XML features". "XML structure" refers to the positioning of various XML nodes relative to others XML nodes. For example, an anchor ("A") node containing an image ("IMG") node is likely an advertisement. After using this structural detection process to match the advertisement content, the system examines the features of the content to determine if the content is an advertisement. To continue the previous example, if the image node contains a link ("href") feature that contains the sub-string "adserver", it is very likely an advertisement. Features may match based on a simple sub-string, as in the example, or a more complicated regular expression. Another form of extraction rule may point to a specific node in an XML structure using some form of XML path specification, such as a "Xpointer". The media editor 264 populates the advertisement extraction rule definition 526 area in the database 200. The advertisement extractor 526 of the advertisement sampling system 220 accesses the data in the advertisement extraction rule definition 526 area to determine which portions of each probed page represent an advertisement.

The advertising support data 530 partition of database 200 comprises database tables that are logically segmented into advertisable taxonomy 532, advertising information 534, rate card 536, and extended advertisable information 538 areas.

The advertisable taxonomy 532 area contains a hierarchical taxonomy of advertisables, attributes that describe what the advertisement is advertising. This taxonomy includes industries, companies, products, Web sites, Web sub-sites, messages, etc. Each node in the hierarchy has a type that specifies what kind of entity it represents and a parent node. For example, the hierarchy may specify that products live within companies, which in turn live within industries. The media editor 264 populates the advertisable taxonomy 532 area in the database 200. The user interface 240 accesses the data in the advertisable taxonomy 532 area to generate statistical data and record where companies, industries, etc. tend to advertise. The Web front end 250 also accesses the data in the advertisable taxonomy 532 area to display this information to the client 140.

The advertising information 534 area contains the data that describe what each unique advertisement recorded by the system advertises. The tables in the advertising information 534 area associate advertisables with advertisements. For example, the system may associate a company type of advertisable with a specific advertisement to indicate that the advertisement is advertising the company. The system uses the following methods to associate an advertisable with an advertisement:

1. A "direct classification" assigns an advertisable directly to the advertisement. For example, a media editor 264 creates a direct classification by specifying that a particular advertisement advertises the "Honda" advertisable.
2. A "location classification" assigns an advertisable to a location prefix that the system uses to match the destination of the advertisement. For example, a media editor 264 creates a location classification by specifying that the location "com.honda" indicates an advertisement for Honda. An advertisement that points to "com.honda.www/cars", therefore, associates the advertisement with Honda.
3. An "ancestral classification" assigns an ancestor of the advertisable to an advertisement. For example, if a direct classification assigns Honda to an advertisement, the "automotive" industry advertisable is a predecessor of Honda. Ancestral classification uses this relationship to associate automotive to the advertisement.

The media editor 264 populates the advertising information 534 area in the database 200. The user interface 240 accesses the data in the advertising information 534 area to generate statistical data.

The rate card 536 area contains data describing the cost of advertisements on a Web site. These costs include monetary values for each specific shape, size, or length of run that advertisers on the Internet 100 use to determine the cost of advertisement purchases. The system stores rate card data for each Web site that the system probes. The media editor 264 populates the rate card 536 area in the database 200. The user interface 240 accesses the data in the rate card 536 area to generate statistical data.

The extended advertisable information 538 area contains additional information about specific types of advertisables not readily captured in the taxonomy hierarchy. Specifically, this includes additional information related to Web sites and companies, such as company contact information, Web site, and media kit URLs. This information extends the usefulness of the system by providing additional information to the client 140 about probed entities. For example, a client 140 may follow a hyperlink to company contact information directly from a system report. The media editor 264 populates the extended advertisable information 538 area in the database 200. The Web front end 250 accesses the data in the extended advertisable information 538 area to deliver value-added information to a client 140.

The advertising summary 540 partition of database 200 comprises database tables that are logically segmented into advertising statistics 542, data integrity 544, and advertising information summary 546 areas.

The advertising statistics 542 area describes how often an advertisement appears on each Web site. The system calculates and stores the following statistics in this area.
1. The proportion of page views that display an advertisement to the total number of page view. The system determines this statistic by analyzing the probing records.
2. The number of impressions that an advertisement received. The system determines this statistic by measuring traffic levels for the Web site using the site definition and traffic data, and multiplying that measurement by the proportion of page views calculated above.
3. The amount of spending that an advertisement received. The system determines this statistic by applying the rate card information to the number of impressions that the advertisement receives calculated above.

The statistical summarization system 230 populates the advertising statistics area 542 in the database 200. The Web front end 250 accesses the data in the advertising statistics 542 area to report spending, impressions, and advertising rotation to the client 140.

The data integrity 544 area contains in-depth information about statistical outliers and other potential anomalies resulting from trend and time slice analyses. This automated monitoring and analysis guarantees that the system will contain accurate analysis data. In addition, the system uses real world advertising information, as an input to the system, to verify the accuracy of the analysis data. The data integrity analysis system, performed by the statistical summarization system 230, populates the data integrity 544 area in the database 200. The operator 262 accesses the data integrity 544 area to detect potential errors and monitor general system health.

The advertising information summary 546 area summarizes advertising information in a format that is compact and easy to distribute. The system extracts the data in this area from the advertising support data 530 partition. While the data is not as descriptive as the data in the advertising support data 530 partition, it provides the ability to quickly perform a precise query. The advertising support data 530 partition associates each advertisement with a company, product, or industry. If the system associates multiple advertisables of the same type with an advertisement, a single advertisable is chosen to summary those associates using an assignment priority system, as follows:

1. Advertisables associated with an advertisement using direct classification receive the highest possible priority, "M".
2. Advertisables associated with an advertisement using location classification receive priority equal to the string length of the location prefix to which they are assigned, therefore, a long location prefix string will receive a higher priority than a short location prefix string.
3. Advertisables associated with an advertisement using ancestral classification receive the priority of the assigned ancestor.
4. The advertisement receives the highest priority advertisable in each type.
5. When two ancestors having the same type and priority are assigned to an advertisement, a conflict occurs and must be corrected by the media editor 264.

The statistical summarization system 230 populates the advertising information summary 546 area in the database 200. The Web front end 250 accesses the advertising information summary 546 area to generate reports for the client 140.

The following description discusses one embodiment of the database structure illustrated in FIG. 5. This data model is encoded in an Oracle database. The table structure comprises three environments, the core schema, analysis schema, and front end. The core schema describes the back-end environment which allow the Cloudprober to direct live autonomous processes that continuously scour the Web noting advertising activity and operators and media editors for the present invention to direct, monitor and augment information provided by the Cloudprober. The analysis schema is the back-end environment that allows the advertisement sampling system, also known as OMNIAC, to apply rigorous data analysis procedures to information gathered from the Web. The front end schema assists a client of the present invention with accessing data, building database query strings, and generating reports.

The database objects comprising the "core schema" are most frequently used by various components of the OMNIAC system. Code bases that rely on this schema include implementation of the back-end processes that pull advertisements from the Web. Additionally, database schemas utilized by other components associated with OMNIAC are composed of some or all of the tables in the core schema. The core schema is conceptually composed of four sub-schemas including advertising, advertisements, probing, and sites. The advertising sub-schema holds information about "advertisable" entities along with which entities each advertisement is advertising. The advertisements sub-schema describes the advertisements that the system has located and analyzed. The probing sub-schema defines "when", "where", and "how" for the probing process. The sites sub-schema describes Web sites, including structural site definitions and rate card information.

Of the four sub-schemas, Advertising serves the most general purpose and is therefore the most frequently referenced. The primary table in this sub-schema is ADVERTISABLE, which defines advertisables. Many of the conceptual entities in OMNIAC's universe are advertisables: industries, companies, products, services and Web sites are all defined here. The type field, referencing the ADVERTISABLE_TYPE table, differentiates between different types of advertisables, and the parent field organizes records hierarchically, establishing such relationships as industry-contains-company and company-produces-product.

In addition to the inherent grouping implied by the parent-child relationship defined in ADVERTISABLE, ADVERTISABLE_GROUP_MEMBER is used to further group advertisables. Examples of groups defined in this way include automotive classes, travel industry segments, and types of computer hardware.

Other tables in the Advertising sub-schema serve to define what is advertised by each advertisement. ADVERTISES is used to associate advertisables directly with advertisements. LOCATION_ADVERTISES, CLASSIFIED_LOCATION and LOCATION_MATCHES also indirectly associate advertisables with advertisements via the advertisement's destination location.

"Advertisements" referred to above are references to records in AD, the primary table in the Advertisements sub-schema. The Advertisements sub-schema serves to define each advertisement in OMNIAC's universe. Every unique advertisement has a record in AD, along with one or more records in AD_DEFINITION. Advertisement definitions are unique XML fragments OMNIAC has retrieved from the Web. Ads are unique advertisements defined by sets of advertisement definitions determined to be equivalent during automated classification.

Other tables in Advertisements contain advertisement attributes, referenced by AD and AD_DEFINITION. AD_TECHNOLOGY describes known Web technologies used to render advertisements, while TEXT describes textual content for certain advertisements. FUZZY_WEB_LOCATION contains fuzzy locations found in advertisements. A fuzzy location is a URL that needs to be processed by the system, such as an anchor or image. Once OMNIAC has loaded a fuzzy location, a reference is made to MIME_CONTENT if the URL references an image, or DEST_WEB_LOCATION if the URL references another HTML page.

Moving on, the Probing sub-schema controls the behavior of OMNIAC's probing and advertisement extraction components. The primary purpose of this schema is to define target sets. A target set is a conceptual construct that instructs OMNIAC to fetch a set of pages at certain intervals, extracting advertisements using a set of rules called extraction rules. Each target set is defined by a row in TARGET_SET.

The frequencies, locations, and extraction rules that make up each target set are defined in STROBE, AD_WEB_LOCATION, and EXTRACTION_RULE, respectively. The many-to-many relationships between rows in these tables are defined in TS_RUNS_AT, TS_PROBES, and TS_APPLIES.

The fourth and final sub-schema is Sites, which simply records information about Web sites. Each site or subsite defined in the advertisable hierarchy has a corresponding record in SITE_INFO, along with a number of rows in SITE_DOMAIN and SITE_MONTHLY_DATA. SITE_DOMAIN describes the physical structure of a site in terms of inclusive and exclusive URL stems. SITE_MONTHLY_DATA records advertising rate cards, third party traffic estimates, and cache statistics for each site on a monthly basis.

The analysis schema is an extension to the core schema that includes a number of additional tables populated by OMNIAC's analysis module. The analysis module is the unit in charge of processing information held in the core schema, producing a trim dataset that accurately describes advertising activity.

Like the core schema, the analysis schema is composed of four conceptual sub-schemas composed of tables implementing common functionality. These sub-schemas include advertising decomposition, advertisement view summarization, slot statistics, and site statistics. The advertising decomposition sub-schema holds information about each advertisement in the system, including attributes and what the advertisement is advertising. The advertisement view summarization sub-schema summarizes advertisement views, recording how many times each advertisement was seen in each slot over the course of a day. The slot statistics sub-schema describes advertisement rotation for each slot during each time period. The site statistics sub-schema describes site information, including advertisement rotation for each time period.

The primary table in the Advertising Decomposition sub-schema is AD_INFO, which contains de-normalized records describing advertisement attributes. AD_INFO records are keyed off of ID's in the AD table; an AD_INFO record exists for each AD record that has been completely classified and represents a valid advertisement. AD_INFO is populated by the analysis module from the advertising relationships described in the core schema tables ADVERTISES and LOCATION_ADVERTISES.

Fields in AD_INFO that specify what is advertised by an advertisement are: CATEGORY (industry), ORGANIZATION (company), ORGANIZATION_GROUP (industry segment), ORGANIZATION_OVERGROUP, COMMODITY (product/service), COMMODITY_GROUP (product/service segment), COMMODITY_OVERGROUP, and MESSAGE.

AD_INFO also includes fields describing a number of non-advertising attributes. FORMAT, referencing AD_SLOT_TYPE.ID, specifies the form factor of an advertisement. TECHNOLOGY, referencing AD_TECHNOLOGY2.ID, specifies the technology used to implement the advertisement. DEFINITION, IMAGE, and DESTINATION specify the AD_DEFINITION, IMAGE, and DEST_WEB_LOCATION records associated with the advertisement. These three fields mirror fields in the AD table.

The Advertising Decomposition schema contains a few tables in addition to AD_INFO.

ADV_IMPLICATION is a cache of advertisable implications derived from the hierarchy in ADVERTISABLE. This is used to speed operation of the analysis module. AD_INFO_FLATTENED is a more readily queried version of AD_INFO containing advertisement/advertisable pairs for each of the fields in AD_INFO that reference ADVERTISABLE. Finally, AD_TECHNOLOGY2 describes advertisement technologies understood by the analysis module that are presentable to the user in the front end.

The Advertisement View Summarization sub-schema covers the single table 5 PLACEMENT_SUMMARY. PLACEMENT_SUMMARY is keyed off of day, advertisement, and slot, and contains, in the CNT field, the number of times an advertisement was seen in a slot on a particular day.

The analysis module populates PLACEMENT_SUMMARY by aggregating hits recorded in the APD_n tables, one of which exists for each day, n being the ID of the day in question. These tables are created and populated by the back-end as advertisement hits flow into the system.

The third sub-schema in the Analysis schema is Slot Statistics. This sub-schema describes advertisement behavior in the context of slots in addition to information about the slots themselves. A slot is a location on the Web in which advertisements rotate, currently defined in terms of the location ID (a reference to AD WEB LOCATION.ID) and extraction rule ID (a reference to EXTRACTION RULE.ID).

The primary table in the Slot Statistics is SLOT_AD_VIEWS, which records the total views and relative frequency for each advertisement in each slot during each time period. The primary key of this table is composed of the fields PERIOD_TYPE, PERIOD, LOCATION_ID, RULE_ID and AD_ID. Two fields exist outside of the primary key: CNT holds the total number of advertisement views, and FREQUENCY holds the relative frequency.

Also in this sub-schema is SLOT_SUMMARY, which records general slot information outside the context of individual advertisements. Accordingly, this table is keyed off the PERIOD_TYPE, PERIOD, LOCATION_ID and RULE_ID fields. The CNT field records total advertisement views in the slot; this field is divided into the SLOT_AD_VIEWS.CNT to determine relative frequency. Also in SLOT_SUMMARY is a SLOT_TYPE field that specifies the type of advertisement seen most frequently in the slot, and SITE_ID, which specifies which site the slot resides within.

The final table in the Slot Statistics sub-schema is SLOT_TYPE_COUNT. This table is used to determine which value to use in SLOT_SUMMARY.SLOT_TYPE. The number of times each advertisement format was seen is recorded, and the slot type that receives the most views is stuck into SLOT_SUMMARY.SLOT_TYPE.

Figure 6:
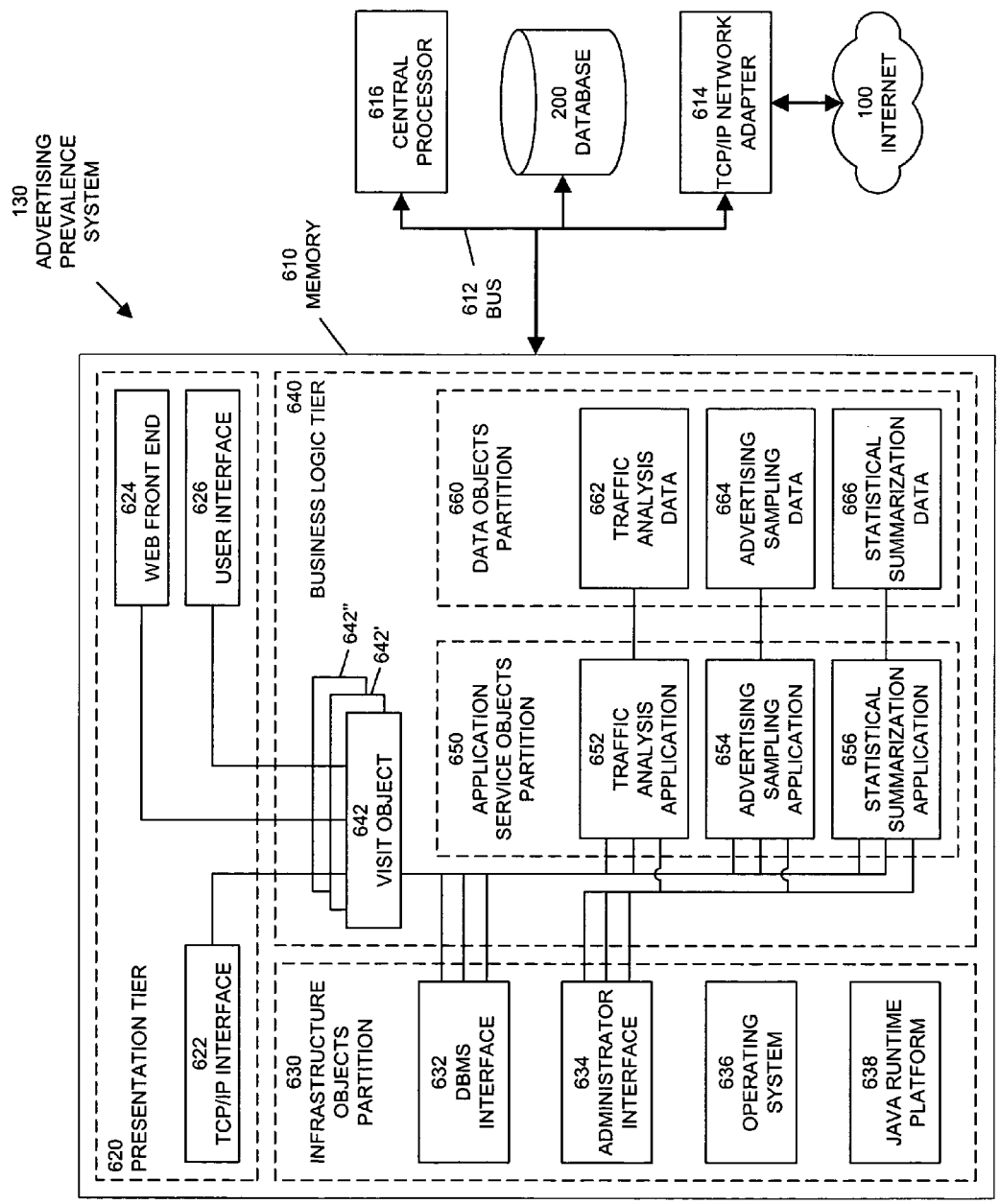
FIG. 6 is a functional block diagram of the advertising prevalence system that shows the configuration of the hardware and software components.

FIG. 6 is a functional block diagram of the advertising prevalence system 130. Memory 610 of the advertising prevalence system 130 stores the software components, in accordance with the present invention, that analyze traffic data on the Internet 100, sample the advertising data from that traffic data, and generate summarization data that characterizes the advertising data. The system bus 612 connects the memory 610 of the advertising prevalence system 130 to the transmission control protocol/internet protocol ("TCP/IP") network adapter 614, database 200, and central processor 616. The TCP/IP network adapter 614 is the mechanism that facilitates the passage of network traffic between the advertising prevalence system 130 and the Internet 100. The central processor 616 executes the programmed instructions stored in the memory 610.

FIG. 6 shows the functional modules of the advertising prevalence system 130 arranged as an object model. The object model groups the object-oriented software programs into components that perform the major functions and applications in the advertising prevalence system 130. A suitable implementation of the object-oriented software program components of FIG. 6 may use the Enterprise JavaBeans specification. The book by Paul J. Perrone et al., entitled "Building Java Enterprise Systems with J2EE" (Sams Publishing, June 2000) provides a description of a Java enterprise application developed using the Enterprise JavaBeans specification. The book by Matthew Reynolds, entitled "Beginning E-Commerce" (Wrox Press Inc., 2000) provides a description of the use of an object model in the design of a Web server for an Electronic Commerce application.

The object model for the memory 610 of the advertising prevalence system 130 employs a three-tier architecture that includes the presentation tier 620, infrastructure objects partition 630, and business logic tier 640. The object model further divides the business logic tier 640 into two partitions, the application service objects partition 650 and data objects partition 660.

The presentation tier 620 retains the programs that manage the interface between the advertising prevalence system 130 and the client 140, account manager 260, operator 262, and media editor 264. In FIG. 6, the presentation tier 620 includes the TCP/IP interface 622, the Web front end 624, and the user interface 626. A suitable implementation of the presentation tier 620 may use Java servlets to interact with the client 140, account manager 260, operator 262, and media editor 264 of the present invention via the hypertext transfer protocol ("HTTP"). The Java servlets run within a request/response server that handles request messages from the client 140, account manager 260, operator 262, and media editor 264 and return response messages to the client 140, account manager 260, operator 262, and media editor 264. A Java servlet is a Java program that runs within a Web server environment. A Java servlet takes a request as input, parses the data, performs logic operations, and issues a response back to the client 140, account manager 260, operator 262, and media editor 264. The Java runtime platform pools the Java servlets to simultaneously service many requests. A TCP/IP interface 622 that uses Java servlets that functions as a Web server that communicates with the client 140, account manager 260, operator 262, and media editor 264 using the HTTP protocol. The TCP/IP interface 622 accepts HTTP requests from the client 140, account manager 260, operator 262, and media editor 264 and passes the information in the request to the visit object 642 in the business logic tier 640. Visit object 642 passes result information returned from the business logic tier 640 to the TCP/IP interface 622. The TCP/IP interface 622 sends these results back to the client 140, account manager 260, operator 262, and media editor 264 in an HTTP response. The TCP/IP interface 622 exchanges data with the Internet 100 via the TCP/IP network adapter 614.

The infrastructure objects partition 630 retains the programs that perform administrative and system functions on behalf of the business logic tier 640. The infrastructure objects partition 630 includes the operating system 636, and an object oriented software program component for the database management system ("DBMS") interface 632, administrator interface 634, and Java runtime platform 638.

The business logic tier 640 retains the programs that perform the substance of the present invention. The business logic tier 640 in FIG. 6 includes multiple instances of the visit object 642. A separate instance of the visit object 642 exists for each client session initiated by either the Web front end 624 or user interface 626 via the TCP/IP interface 622. Each visit object 642 is a stateful session bean that includes a persistent storage area from initiation through termination of the client session, not just during a single interaction or method call. The persistent storage area retains information associated with either the URL 114, 116, 118 or the client 140, account manager 260, operator 262, and media editor 264. In addition, the persistent storage area retains data exchanged between the advertising prevalence system 130 and the traffic sampling system 120 via the TCP/IP interface 622 such as the query result sets from a database 200 query.

Figure 7A:
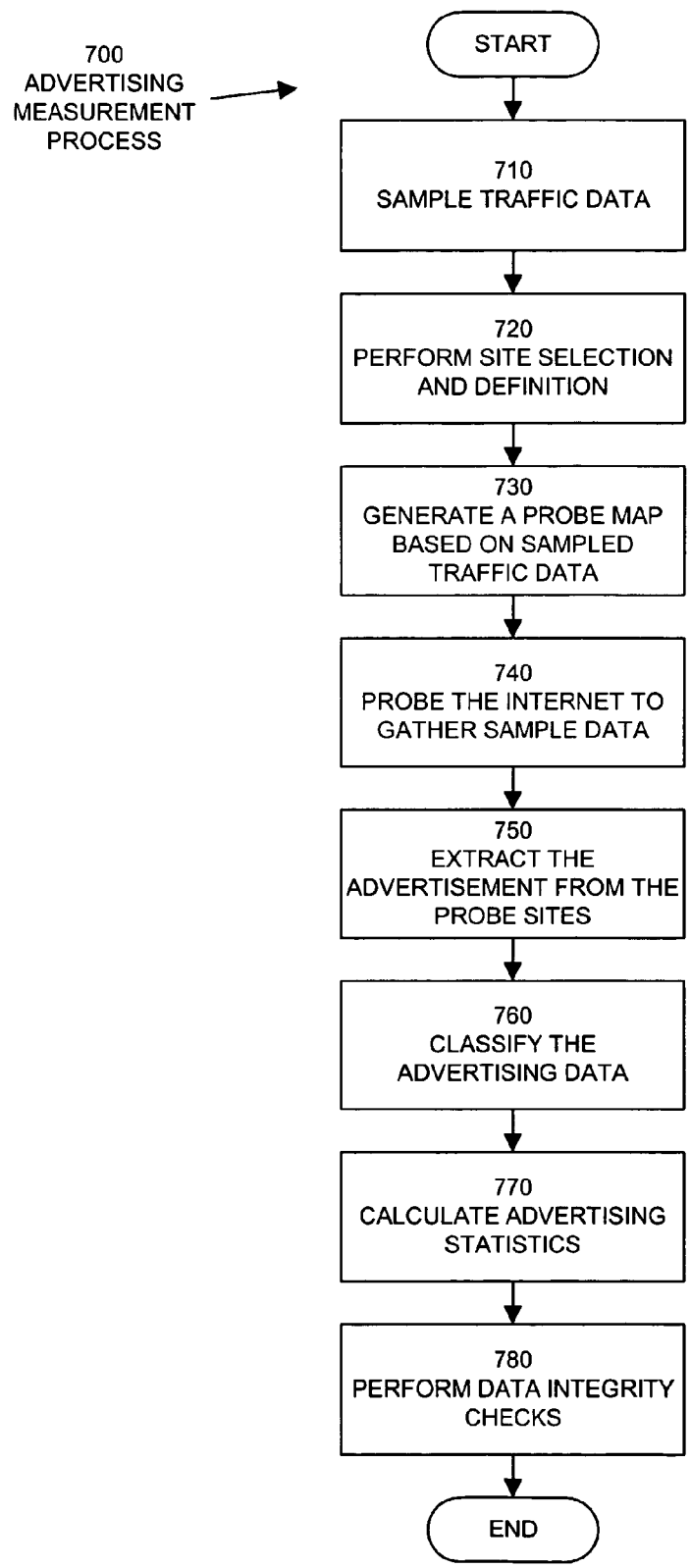
FIG. 7A is a flow diagram of a process in the advertising prevalence system that measures the quality of online advertising and the activity generated by an online advertisement.
Figure 7B:
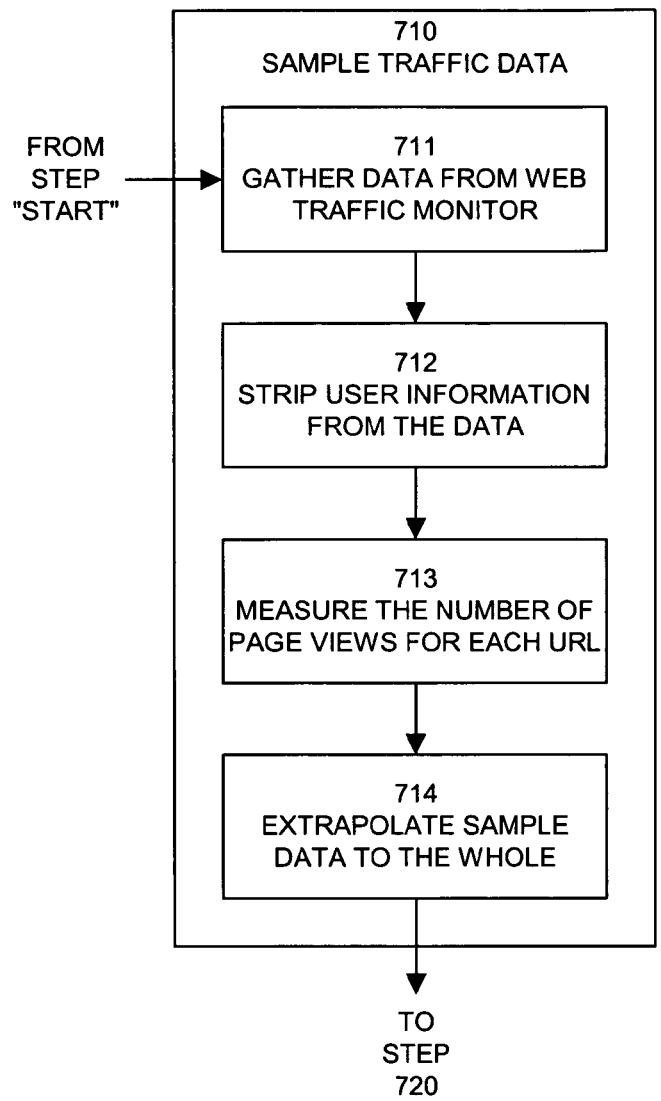
FIG. 7B is a flow diagram that describes, in greater detail, the process of sampling traffic data from FIG. 7A.

When the traffic sampling system 120 finishes collecting information about a URL 114, 116, 118, it sends a message to the TCP/IP interface 622 that invokes a method to create a visit object 642 and stores information about the connection in the visit object 642 state. Visit object 642, in turn, invokes a method in the traffic analysis application 652 to process the information retrieved by the traffic sampling system 120. The traffic analysis application 652 stores the processed data from the anonymity system 310 and probe mapping system 320 in the traffic analysis data 662 state and the database 200. FIGS. 7A and 7B describe, in greater detail, the process that the traffic analysis application 652 follows for each URL 114, 116, 118 obtained from the traffic sampling system 120. Even though FIG. 6 depicts the central processor 616 as controlling the traffic analysis application 652, it is to be understood that the function performed by the traffic analysis application 652 can be distributed to a separate system configured similarly to the advertising prevalence system 130.

After the traffic analysis application 652 processes a URL 114, 116, 118 identified by the traffic sampling system 120, the visit object 642 invokes a method in the advertising sampling application 654 to retrieve the URL 114, 116, 118 from the Web site 110. The advertising sampling application 654 processes the retrieved Web page by extracting embedded advertisements and classifying those advertisements. The advertising sampling application 654 stores the data retrieved by the Web page retrieval system 322 and processed by the Web browser emulation environment 324, advertisement extractor 326, and the structural classifier 328 in the advertising sampling data 664 state and the database 200. FIGS. 7A, 7C, 7D, and 7E describe, in greater detail, the process that the advertising sampling application 654 follows for each URL 114, 116, 118 identified by the traffic sampling system 120. Even though FIG. 6 depicts the central processor 616 as controlling the advertising sampling application 654, a person skilled in the art will realize that the processing performed by the advertising sampling application 654 can be distributed to a separate system configured similarly to the advertising prevalence system 130.

Figure 7C:
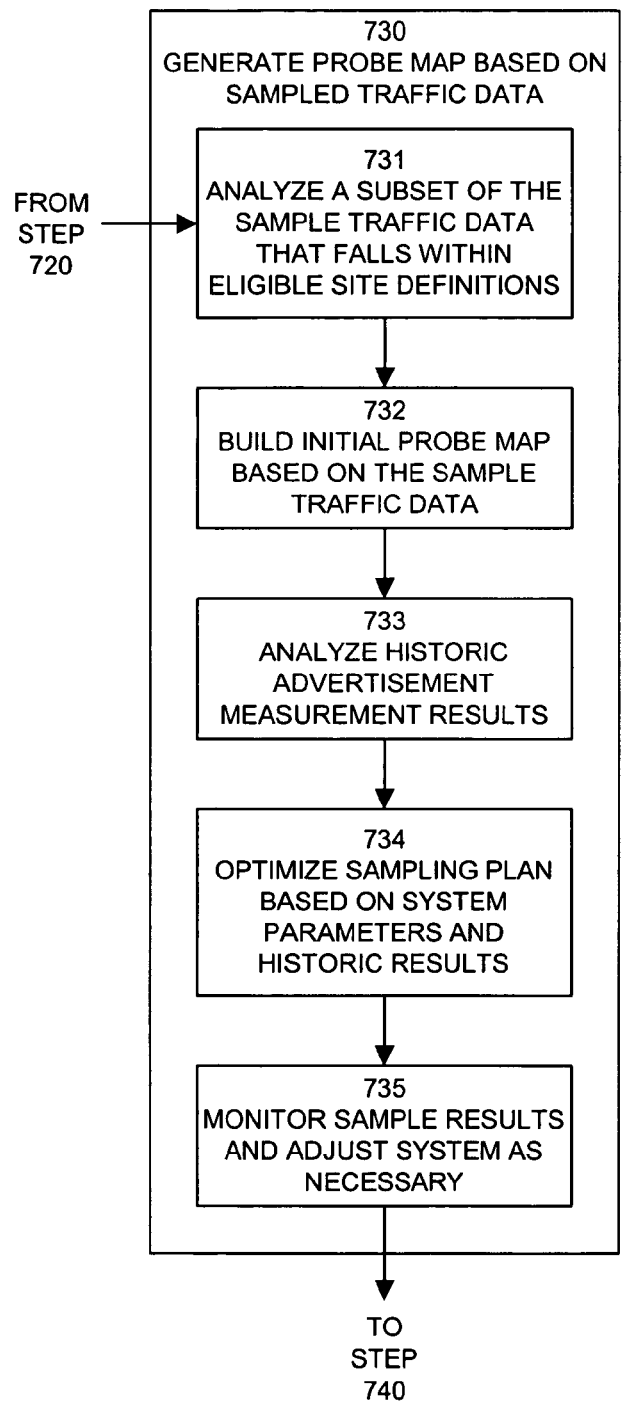
FIG. 7C is a flow diagram that describes, in greater detail, the process of generating a probe map based on sampled traffic data from FIG. 7A.
Figure 7D:
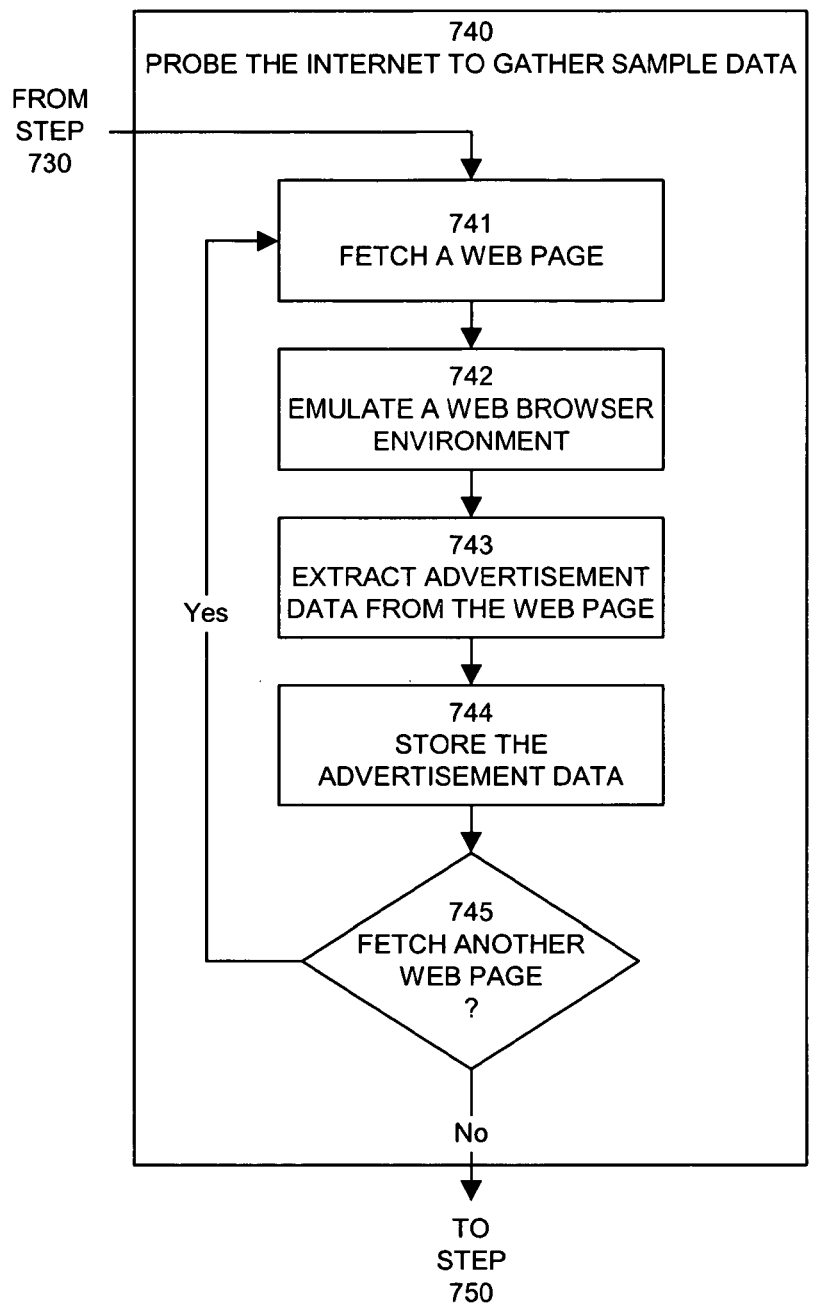
FIG. 7D is a flow diagram that describes, in greater detail, the process of probing the Internet to gather sample data from FIG. 7A.
Figure 7E:
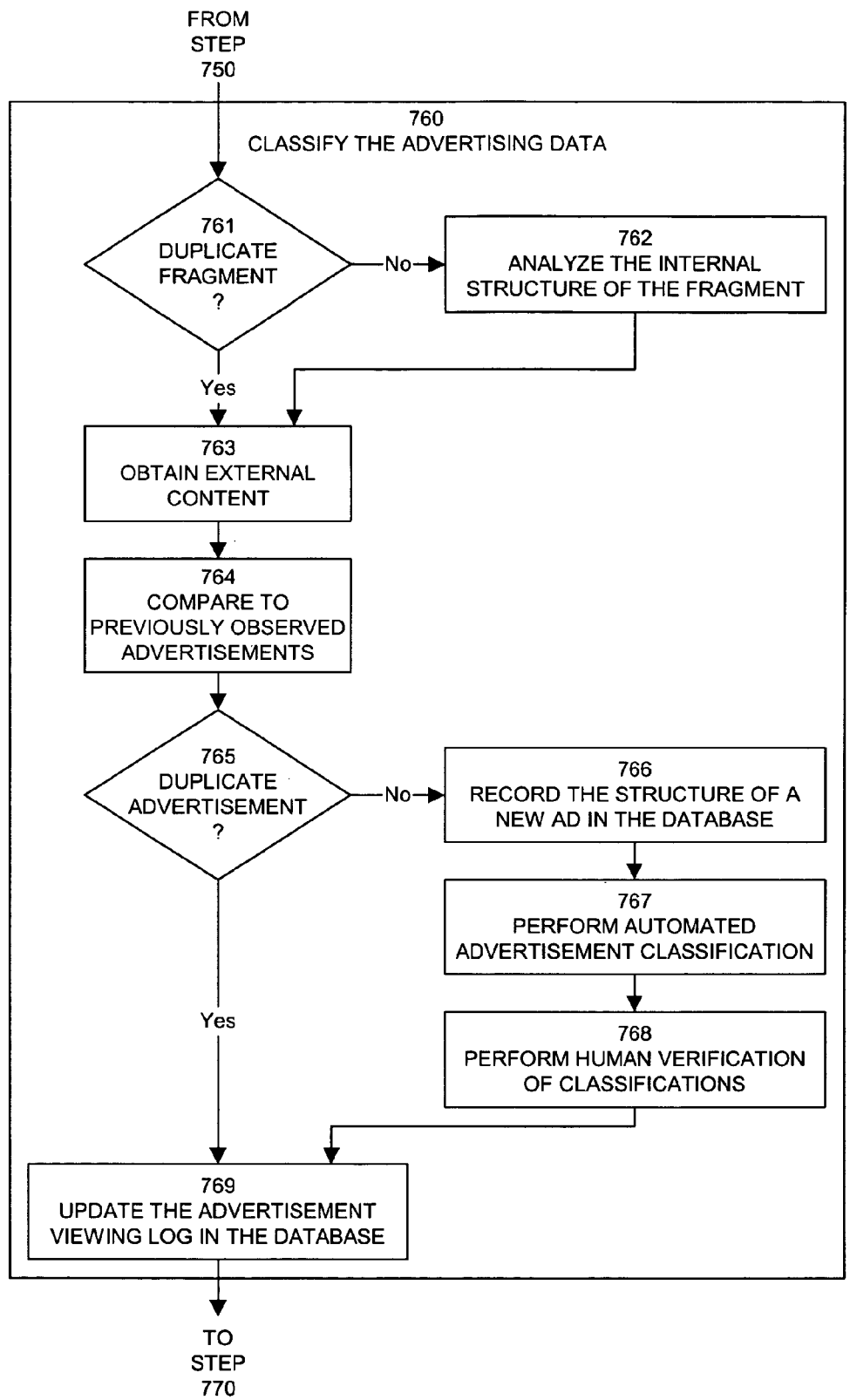
FIG. 7E is a flow diagram that describes, in greater detail, the process of classifying the advertising data from FIG. 7A.
Figure 7F:
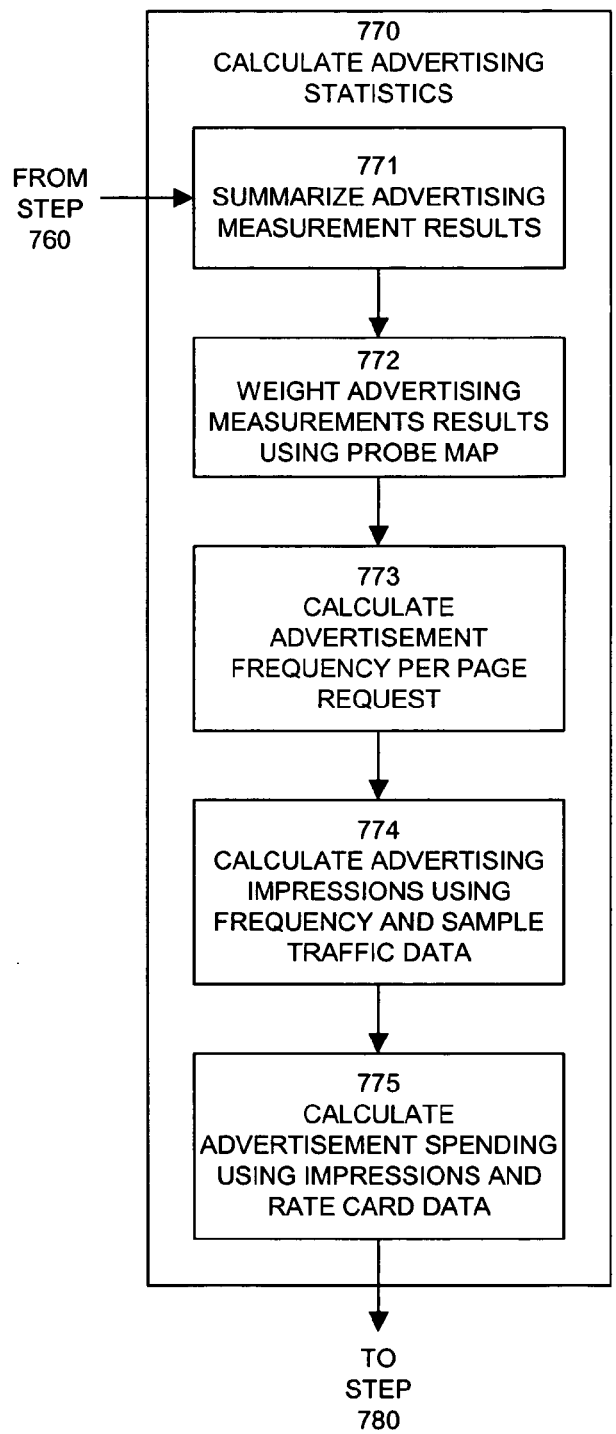
FIG. 7F is a flow diagram that describes, in greater detail, the process of calculating advertising statistics from FIG. 7A.

After the traffic analysis application 652 and the advertisement sampling system 654 process the URL 114, 116, 118 identified by the traffic sampling system 120, the visit object 642 invokes a method in the statistical summarization application 656 to compute summary statistics for the data. The statistical summarization application 656 computes the advertising impression, spending, and valuation statistics for each advertisement embedded in URL 114, 116, 118. The statistical summarization application 656 stores the statistical data in the statistical summarization data 666 state and the database 200. FIG. 7F describes, in greater detail, the process that the statistical summarization application 656 follows for each URL 114, 116, 118 identified by the traffic sampling system 120. Even though FIG. 6 depicts the central processor 616 as controlling the statistical summarization application 656, a person skilled in the art realizes that the function performed by the statistical summarization application 656 can be distributed to a separate system configured similarly to the advertising prevalence system 130.

FIG. 7A is a flow diagram of a process in the advertising prevalence system 130 that measures the value of online advertisements by tracking and comparing online advertising activity across all major industries, channels, advertising formats, and types. Process 700 begins, at step 710, by sampling traffic data from the Internet 100. FIG. 7B describes step 710 in greater detail. Step 720 uses the sampled traffic data from step 710 to perform site selection, and define and refine site definitions for the advertising prevalence system 130. Step 730 uses the result of the site selection and definition process to generate a probe map based on the sampled traffic data. FIG. 7C describes step 730 in greater detail. Step 740 uses the probe map from step 730 to visit the Internet 100 to gather sample data from the probe sites identified in step 730. FIG. 7D describes step 740 in greater detail. For each URL retrieved in step 740, step 750 extracts the advertisements from the URL, step 760 classifies each advertisement, and step 770 calculates the statistics for each advertisement. FIGS. 7E and 7F describe, respectively, steps 760 and 770 in greater detail. Finally, process 700 performs data integrity checks in step 780 to verify the integrity of the data and analysis results in the system.

FIG. 7B is a flow diagram that describes, in greater detail, the process of sampling traffic data from FIG. 7A, step 710. Process 710 begins in step 711 by gathering data from a Web traffic monitor such as the traffic sampling system 120. Process 710 strips the user information from the data retrieved by the Web traffic monitor in step 712 to cleanse the data and guarantee the anonymity of the sample. For each URL in the cleansed sample, step 713 measures the number of Web page views observed in the traffic data. Step 714 completes process 710 by statistically extrapolating the measured number of Web page views in the sample to whole universe of the Internet 100.

FIG. 7C is a flow diagram that describes, in greater detail, the process of generating a probe map based on sampled traffic data from FIG. 7A, step 730. Process 730 begins in step 731 by analyzing a subset of the sample traffic data that falls within eligible site definitions. Following the analysis in step 731, step 732 builds an initial probe map based on the sample traffic data. Step 733 analyzes the historic advertisement measurement results in the database 200 for the URLs in the initial probe map. Step 734 uses these historic results as well as system parameters to optimize the sampling plan. Step 735 completes process 730 by monitoring the sample results and adjusting the system as necessary.

FIG. 7D is a flow diagram that describes, in greater detail, the process of probing the Internet to gather sample data from FIG. 7A, step 740. Process 740 begins in step 741 by fetching a Web page from the Internet 100. The Web page from step 741 is passed to a Web browser emulation environment in step 742 to simulate the display of that Web page in a browser. This simulation allows the advertising prevalence system 130 to detect advertisements embedded in the Web page. These advertisements may be embedded in JavaScript code, Java applet or servlet code, or common gateway interface code such as a Perl script. In addition, the simulation in step 742 allows the advertising prevalence system 130 to detect dynamic and interactive advertisements in the Web page. After the simulation in step 742, step 743 extracts the advertisement data from the Web page and step 744 stores the advertisement data in the database 200. Step 745 determines whether process 740 needs to fetch another Web page to gather more sample data. In the preferred embodiment, process 740 continuously samples Web pages from the Internet 100. A person skilled in the art realizes that the functionality performed by step 745 can be associated with a scheduling system that will schedule the probing of the Internet 100 to gather the sample advertising data.

FIG. 7E is a flow diagram that describes, in greater detail, the process of classifying the advertising data from FIG. 7A, step 760. Process 760 begins the analysis of advertisement fragments in step 761 by determining whether the fragment is a duplicate. When the advertising prevalence system 130 encounters an advertisement fragment for the first time, step 762 analyzes the internal structure of the fragment. Following step 762, or when step 761 determines that the advertisement fragment is a duplicate, step 763 retrieves the external content of the advertisement from the Web page. Step 764 then compares the external content to previously observed advertisements. Step 765 analyzes the result of the comparison in step 764 to determine whether the advertisement is a duplicate. When the advertising prevalence system 130 encounters an advertisement for the first time, step 766 begins processing the new advertisement by recording the structure of the new advertisement in the database 200. Step 767 then performs automated advertisement classification and stores the classification types in the database 200. Step 768 completes processing of a new advertisement by performing human verification of the advertisement classifications. Following step 768, or when step 765 determines that the advertisement is a duplicate, step 769 updates the advertisement viewing log in the database 200 to indicate the observation of the advertisement.

FIG. 7F is a flow diagram that describes, in greater detail, the process of calculating advertising statistics from FIG. 7A, step 770. Process 770 begins the calculation of the advertising statistics in step 771 by summarizing the advertising measurement results. In step 772, process 770 uses the probe map generated in step 730 to weight the advertising measurement results. The advertising frequency is calculated in step 773 for each Web page request. Step 774 uses the sample traffic data from step 710 and the advertising frequency from step 773 to calculate the advertising impressions for each advertisement. Step 775 completes process 770 by calculating the advertisement spending by combining the advertising impressions from step 774 and the rate card data input by the media editor 264 with the rate card collection 348 module of the user interface 240.

Although embodiments disclosed in the present invention describe a fully functioning system, it is to be understood that other embodiments exist which are equivalent to the embodiments disclosed herein. Since numerous modifications and variations will occur to those who review the instant application, the present invention is not limited to the exact construction and operation illustrated and described herein. Accordingly, all suitable modifications and equivalents which may be resorted to are intended to fall within the scope of the claims.

We claim:

1. A system for comprising:
   a processor to execute instructions to:
   transmit a first number of first webpage requests via a computer network to a webpage server computer, the first webpage request identifying a particular webpage of a website hosted by the webpage server computer,
   extract instances of media objects from webpage response received via the computer network in response to the first webpage requests;
   determine that a subset of the instances of the media objects are a same identified media object;
   determine a second number of times that the identified media object is included in the webpage responses, wherein the first number is greater than the second number;
   an estimating device to:
   determine an estimated rotation rate for the identified media object based on the first number and the second number by dividing the second number of times by the first number of times and
   monitor second webpage requests transmitted via the computer network by computing devices of an audience of the website to determine an audience estimate of a number of times that the audience has requested the webpage; and
   a statistical summarization system including a processor to multiply the estimated rotation rate by the audience estimate to estimate a third number of times that the identified media object has been presented to the audience via transmissions of the webpage via the computer network.

2. The system as defined in claim 1, wherein the identified media object is an advertisement to be presented in association with the webpage.

3. The system as defined in claim 1, wherein at least a portion of the number of times that the audience has requested the webpage is determined from information received from a panelist computer.

4. The system as defined in claim 1, wherein at least a portion of the number of times that the audience has requested the webpage is determined from a proxy that receives communications in the computer network.

5. The system of claim 1, wherein the processor is to execute the instructions to extract instances of media objects from webpage responses by:
   simulating display of a webpage response in the webpage responses; and
   executing executable instructions included in the webpage response to generate the identified media object.

6. The system of claim 1, wherein the processor is to execute the instructions to extract instances of media objects from webpage responses by:
   transforming a webpage response in the webpage responses into an extensible markup language; and
   parsing the extensible markup language to identify a tag indicative of the identified media object.

7. The system of claim 1, wherein the processor is to execute the instructions to determine that a subset of the instances of the media objects are the same identified media object by:
   extracting a click-through-uniform resource locator from a first one of the instances; and
   determining that a first instance and a second instance belong to the subset in response to determining that the second instance is associated with the click-through-uniform resource locator.

8. A method comprising:
   transmitting a first number of first webpage requests via a computer network to a webpage server computer, the first webpage requests identifying a particular webpage of a website hosted by the webpage server computer,
   extracting instances of media objects from webpage responses received via the computer network in response to the first webpage requests;
   determining that a subset of the instances of the media objects are a same identified media object;
   determining a second number of times that the identified media object is included in the webpage responses, wherein the first number is greater than the second number;
   determining an estimated rotation rate for the identified media object based on the first number and the second number by dividing the second number of times by the first number of times;
   monitoring second webpage requests transmitted via the computer network by computing device of an audience of the website to determining an audience estimate of a number of times that the audience has requested the webpage; and
   multiplying the estimated rotation rate by the audience estimate to estimate a third number of times that the identified media object has been presented to the audience via transmissions of the webpage via the computer network.

9. The method as defined in claim 8, wherein the identified media object is an advertisement to be presented in association with the webpage.

10. The method as defined in claim 8, wherein the number of times that the audience has requested the webpage is determined based on information received from at least one panelist computer.

11. The method as defined in claim 8, wherein at least a portion of the number of times that the audience has requested the webpage is determined from a proxy that receives communications in the computer network.

12. A computer readable storage disk or storage device comprising instructions that when executed cause a machine to at least:
- transmit a first number of first webpage requests via a computer network to a webpage server computer, the first webpage requests identifying a particular webpage of a website hosted by the webpage server computer,
- extract instances of media objects from webpage responses received via the computer network in response to the first webpage requests;
- determine that a subset of the instances of the media objects are a same identified media object;
- determine a second number of times that the identified media object is included in the webpage responses, wherein the first number is greater than the second number;
- determine an estimated rotation rate for the identified media object based on the first number and the second number by dividing the second number of times by the first number of times;
- monitor second webpage requests transmitted via the computer network by computing devices of an audience of the webpage to determine an audience estimate of a number of times that the audience has requested the webpage; and
- multiply the estimated rotation rate by the audience estimate to estimate a third number of times that the identified media object has been presented to the audience via transmissions of the webpage via the computer network.

13. The computer readable storage disk or storage device as defined in claim 12, wherein the identified media object is an advertisement to be presented in association with the webpage.

14. The computer readable storage disk or storage device as defined in claim 12, wherein the number of times that the audience has requested the webpage is determined based on information received from a panelist computer.

15. The computer readable storage disk or storage device as defined in claim 12, wherein the number of times that the audience has requested the webpage is determined from information received from a proxy that receives communications in the computer network.

* * * * *

UNITED STATES PATENT AND TRADEMARK OFFICE
CERTIFICATE OF CORRECTION

Page 1 of 1

PATENT NO.         : 9,514,479 B2
APPLICATION NO.    : 14/147618
DATED              : December 6, 2016
INVENTOR(S)        : Gregory J. Lauckhart et al.

It is certified that error appears in the above-identified patent and that said Letters Patent is hereby corrected as shown below:

In the Claims

Column 28, Line 3:
Replace "webpage" with --website--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*